(12) United States Patent
Tsai et al.

(10) Patent No.: US 8,964,308 B2
(45) Date of Patent: Feb. 24, 2015

(54) IMAGING CAPTURING LENS ASSEMBLY

(71) Applicant: Largan Precision Co., Ltd., Taichung (TW)

(72) Inventors: Tsung-Han Tsai, Taichung (TW); Ming-Ta Chou, Taichung (TW)

(73) Assignee: Largan Precision Co., Ltd., Taichung (TW)

(*) Notice: Subject to any disclaimer, the term of this patent is extended or adjusted under 35 U.S.C. 154(b) by 274 days.

(21) Appl. No.: 13/712,463

(22) Filed: Dec. 12, 2012

(65) Prior Publication Data

US 2014/0126073 A1    May 8, 2014

(30) Foreign Application Priority Data

Nov. 2, 2012  (TW) ............... 101140866 A

(51) Int. Cl.
G02B 9/60 (2006.01)
G02B 13/00 (2006.01)

(52) U.S. Cl.
CPC .................. G02B 13/0045 (2013.01)
USPC ............ 359/764; 359/746; 359/766

(58) Field of Classification Search
CPC .................................... G02B 13/0045
USPC .................. 359/659, 714, 746, 766
See application file for complete search history.

(56) References Cited

U.S. PATENT DOCUMENTS

| | | | |
|---|---|---|---|
| 8,179,470 B2 | 5/2012 | Chen et al. | |
| 8,179,615 B1 * | 5/2012 | Tang et al. | 359/714 |
| 8,305,697 B1 * | 11/2012 | Chen et al. | 359/714 |
| 8,687,293 B2 * | 4/2014 | Chen et al. | 359/764 |
| 2011/0273611 A1 | 11/2011 | Matsusaka et al. | |
| 2012/0154929 A1 | 6/2012 | Tsai et al. | |
| 2012/0314296 A1 * | 12/2012 | Shabtay et al. | 359/662 |
| 2013/0170048 A1 | 7/2013 | Lai | |

FOREIGN PATENT DOCUMENTS

CN    102483512 A    5/2012

OTHER PUBLICATIONS

Intellectual Property Office, Ministry of Economic Affairs, R.O.C., "Office Action", Dec. 11, 2014, Taiwan.

* cited by examiner

*Primary Examiner* — Thomas K Pham
*Assistant Examiner* — Vipin Patel
(74) *Attorney, Agent, or Firm* — Morris Manning & Martin LLP; Tim Tingkang Xia, Esq.

(57) ABSTRACT

An imaging capturing lens assembly includes, in order from an object side to an image side, a first lens element, a second lens element, a third lens element, a fourth lens element and a fifth lens element. The first lens element with positive refractive power has a convex object-side surface and a convex image-side surface. The second lens element with negative refractive power has a concave image-side surface. The third lens element has positive refractive power. The plastic fourth lens element with negative refractive power has a concave object-side surface and a convex image-side surface, wherein the surfaces are aspheric. The plastic fifth lens element has a concave image-side surface, wherein an object-side surface and the image-side surface are aspheric, and at least one surface has at least one inflection point.

20 Claims, 20 Drawing Sheets

IMAGING CAPTURING LENS ASSEMBLY

RELATED APPLICATIONS

The application claims priority to Taiwan Application Serial Number 101140866, filed Nov. 2, 2012, which is herein incorporated by reference.

BACKGROUND

1. Technical Field

The present invention relates to an imaging capturing lens assembly. More particularly, the present invention relates to a compact imaging capturing lens assembly applicable to electronic products.

2. Description of Related Art

In recent years, with the popularity of mobile products with camera functionalities, the demand for a miniaturized optical lens system is increasing. The sensor of a conventional photographing camera is typically a CCD (Charge-Coupled Device) image sensor or a CMOS (Complementary Metal-Oxide-Semiconductor) sensor. As the advanced semiconductor manufacturing technologies have allowed the pixel size of sensors to be reduced and compact optical lens systems have gradually evolved toward the field of higher megapixels, there is an increasing demand for compact optical lens systems featuring better image quality.

A conventional compact optical lens system in a portable electronic product mainly adopts a four-element lens structure, such as the one disclosed in U.S. Pat. No. 8,179,470. Due to the popularity of mobile products with high-end specifications, such as smart phones and PDAs (Personal Digital Assistants), requirements of higher megapixels and better image quality have increased rapidly. However, the conventional optical lens systems cannot satisfy the requirements of high-end optical lens systems with camera functionalities.

Although there are optical lens systems with five-element lens structure, such as the one disclosed in U.S. Patent No. 2012/0154929. The image quality of this optical lens system is better, but it is not favorable for correcting its chromatic aberrations since the first and the second lens elements are both with positive refractive power. It is also not favorable for correcting its aberrations since the image-side surface of the second lens element does not have a very strong concave shape. Moreover, it is not favorable for reducing the sensitivity of the optical lens system since the negative refractive power of the optical lens system does not have a balanced distribution.

SUMMARY

According to one aspect of the present disclosure, an imaging capturing lens assembly includes, in order from an object side to an image side, a first lens element, a second lens element, a third lens element, a fourth lens element and a fifth lens element. The first lens element with positive refractive power has a convex object-side surface and a convex image-side surface. The second lens element with negative refractive power has a concave image-side surface. The third lens element has positive refractive power. The fourth lens element with negative refractive power is made of plastic material and has a concave object-side surface and a convex image-side surface, wherein the object-side surface and the image-side surface of the fourth lens element are aspheric. The fifth lens element with refractive power is made of plastic material and has a concave image-side surface, wherein an object-side surface and the image-side surface of the fifth lens element are aspheric, and the fifth lens element has at least one inflection point formed on at least one of the object-side surface and the image-side surface thereof. When a curvature radius of the object-side surface of the first lens element is R1, a curvature radius of the image-side surface of the first lens element is R2, a curvature radius of the object-side surface of the second lens element is R3, a central thickness of the second lens element is CT2, a central thickness of the fourth lens element is CT4, and a central thickness of the fifth lens element is CT5, the following relationships are satisfied:

$$-0.2<(R1+R2)/(R1-R2)<1.0;$$

$$-1.5<R2/R3<0.8; \text{ and}$$

$$0.20<(CT2+CT4)/CT5<0.85.$$

According to another aspect of the present disclosure, an imaging capturing lens assembly includes, in order from an object side to an image side, a first lens element, a second lens element, a third lens element, a fourth lens element and a fifth lens element. The first lens element with positive refractive power has a convex object-side surface and a convex image-side surface. The second lens element with negative refractive power has a concave image-side surface. The third lens element has positive refractive power. The fourth lens element with negative refractive power is made of plastic material and has a concave object-side surface and a convex image-side surface, wherein the object-side surface and the image-side surface of the fourth lens element are aspheric. The fifth lens element with refractive power is made of plastic material and has a concave image-side surface, wherein an object-side surface and the image-side surface of the fifth lens element are aspheric, and the fifth lens element has at least one inflection point formed on at least one of the object-side surface and the image-side surface thereof. When a curvature radius of the object-side surface of the first lens element is R1, a curvature radius of the image-side surface of the first lens element is R2, an axial distance between the third lens element and the fourth lens element is T34, and an axial distance between the fourth lens element and the fifth lens element is T45, the following relationships are satisfied:

$$-0.2<(R1+R2)/(R1-R2)<1.0; \text{ and}$$

$$0<T45/T34\leq0.82.$$

According to still another aspect of the present disclosure, an imaging capturing lens assembly includes, in order from an object side to an image side, a first lens element, a second lens element, a third lens element, a fourth lens element and a fifth lens element. The first lens element with positive refractive power has a convex object-side surface and a convex image-side surface. The second lens element with negative refractive power has a concave image-side surface. The third lens element has positive refractive power. The fourth lens element with negative refractive power is made of plastic material and has a concave object-side surface and a convex image-side surface, wherein the object-side surface and the image-side surface of the fourth lens element are aspheric. The fifth lens element with refractive power is made of plastic material and has a concave image-side surface, wherein an object-side surface and the image-side surface of the fifth lens element are aspheric, and the fifth lens element has at least one inflection point formed on at least one of the object-side surface and the image-side surface thereof. When a curvature radius of the object-side surface of the first lens element is R1, a curvature radius of the image-side surface of the first lens element is R2, an Abbe number of the first lens element is V1, an Abbe number of the second lens element is V2, a central thickness of the second lens element is CT2, a central thickness of the fourth lens element is CT4, and a central thickness of the fifth lens element is CT5, the following relationships are satisfied:

$$-0.2<(R1+R2)/(R1-R2)<1.0;$$

$$0.30<V2/V1<0.55; \text{ and}$$

$$0.20<(CT2+CT4)/CT5<0.85.$$

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
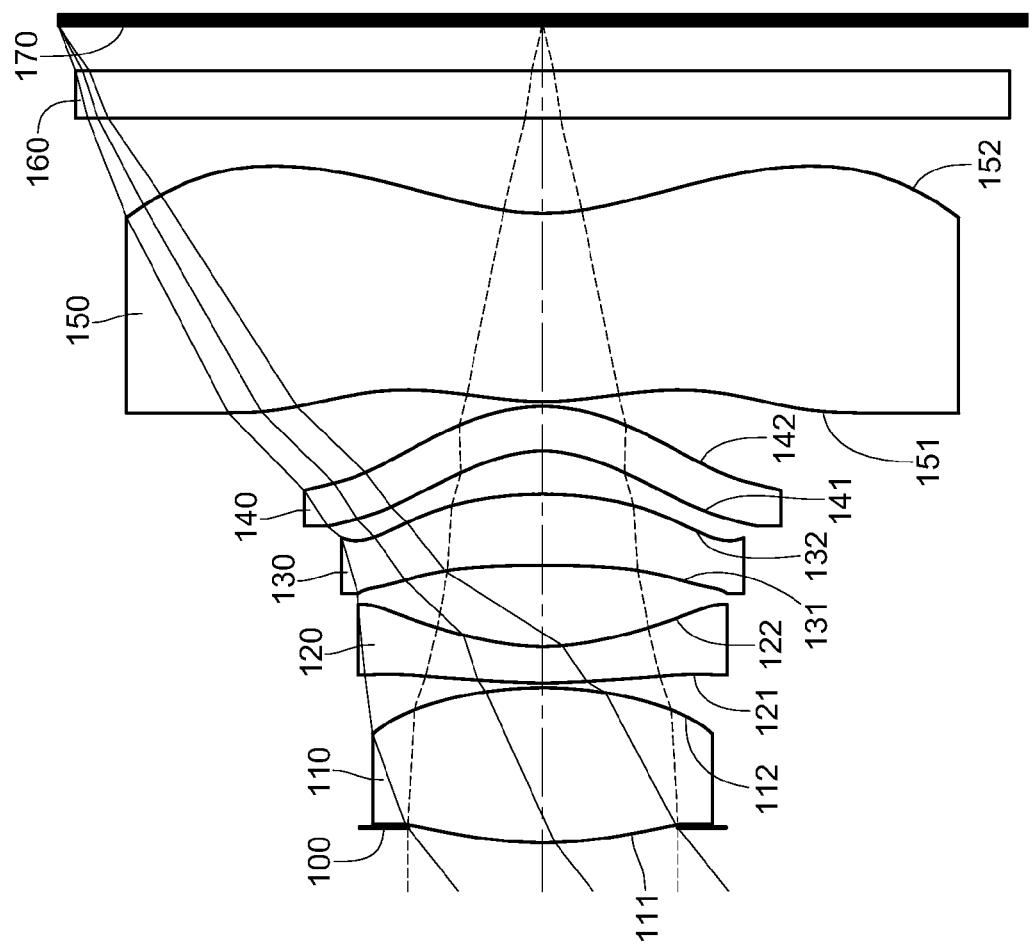
FIG. 1 is a schematic view of an imaging capturing lens assembly according to the 1st embodiment of the present disclosure.

An imaging capturing lens assembly includes, in order from an object side to an image side, a first lens element, a second lens element, a third lens element, a fourth lens element and a fifth lens element.

The first lens element with positive refractive power has a convex object-side surface and a convex image-side surface, so that the total track length of the imaging capturing lens assembly can be reduced by the positive refractive power of the first lens element. The distortion of the imaging capturing lens assembly can be corrected since the convexity of the object-side surface of the imaging capturing lens assembly is not that strong as the image-side surface.

The second lens element with negative refractive power and with a strong concavity formed on the image-side surface corrects the aberration of the imaging capturing lens assembly. In particular, the second lens element has at least one inflection point formed on at least one of the object-side surface and the image-side surface; therefore, the angle at which the incident light projects onto the image sensor from the off-axis field can be effectively reduced, and thereby the sensing efficiency of an image sensor can be improved to correct the aberration caused by the off-axis field.

The third lens element has positive refractive power, so that the distribution of the positive refractive power can be balanced to avoid excessive spherical aberrations.

The fourth lens element with negative refractive power has a concave object-side surface and a convex image-side surface, so that it is favorable for avoiding overloading the negative refractive power on one single lens element in order to reduce the sensitivity of the system. It is also favorable for correcting the astigmatism of the imaging capturing lens assembly.

The fifth lens element with refractive power can have a convex object-side surface and a concave image-side surface and at least one inflection point formed on at least one of the object-side surface and the image-side surface. Accordingly, the angle at which the incident light projects onto an image sensor from the off-axis field can be effectively reduced in order to improve the sensing efficiency of the image sensor to further correct the aberrations caused by the off-axis field.

When a curvature radius of the object-side surface of the first lens element is R1, and a curvature radius of the image-side surface of the first lens element is R2, the following relationship is satisfied: $-0.2<(R1+R2)/(R1-R2)<1.0$. Therefore, it is favorable for correcting the distortion of the imaging capturing lens assembly by arranging a convex object-side surface and a convex image-side surface in which the curvature of the object-side surface is weaker than the image-side surface. Preferably, the following relationship is satisfied: $-0.1<(R1+R2)/(R1-R2)<1.0$.

When the curvature radius of the image-side surface of the first lens element is R2, and a curvature radius of the object-side surface of the second lens element is R3, the following relationship is satisfied: $-1.5<R2/R3<0.8$. It is favorable for reducing the spherical aberrations and correcting the aberrations. Preferably, the following relationship is satisfied: $-1.2 < R2/R3 < 0.4$.

When a focal length of the imaging capturing lens assembly is f, a focal length of the fourth lens element is f4, and a focal length of the fifth lens element is f5, the following relationship is satisfied: $|f/f4|+|f/f5|<1.30$. Therefore, it is favorable for avoiding overloading the refractive power, and for reducing the system sensitivity and also the aberration.

When an Abbe number of the first lens element is V1, and an Abbe number of the second lens element is V2, the following relationship is satisfied: $0.30 < V2/V1 < 0.55$. Therefore, the chromatic aberration of the imaging capturing lens assembly can be corrected.

When a central thickness of the second lens element is CT2, a central thickness of the fourth lens element is CT4, and a central thickness of the fifth lens element is CT5, the following relationship is satisfied: $0.20 < (CT2+CT4)/CT5 < 0.85$. Therefore, it is favorable for manufacturing and assembling the lens elements of the imaging capturing lens assembly since it is easy to make the lens element with an excessively thin thickness or an excessively thick thickness be fragmented or become deformed during manufacturing and assembling processes.

When an axial distance between the third lens element and the fourth lens element is T34 and an axial distance between the fourth lens element and the fifth lens element is T45, the following relationship is satisfied: $0 < T45/T34 \leq 0.82$. Therefore, it is favorable for assembling the lens elements by adjusting the distances between the lens elements in order to raise the manufacturing yield rate.

When the focal length of the imaging capturing lens assembly is f, and the focal length of the fourth lens element is f4, the following relationship is satisfied: $-0.9 < f/f4 < 0$. Therefore, it is favorable for avoiding overloading the negative refractive power on one single lens element, and further for reducing the system sensitivity.

When the curvature radius of the object-side surface of the second lens element is R3, and a curvature radius of the image-side surface of the second lens element is R4, the following relationship is satisfied: $0 < R4/|R3| < 0.80$. Therefore, it is favorable for correcting the aberration of the imaging capturing lens assembly by arranging a stronger curvature on the surface.

When a focal length of the first lens element is f1, a focal length of the second lens element is f2, a focal length of the third lens element is f3, and the focal length of the fourth lens element is f4, the following relationship is satisfied: $f1<|f2|<f3<|f4|$. Therefore, it is favorable for distributing the refractive power properly, for reducing the total track length of the imaging capturing lens assembly, for reducing the sensitivity and for correcting the aberration.

When the Abbe number of the first lens element is V1, the Abbe number of the second lens element is V2, and an Abbe number of the fourth lens element is V4, the following relationship is satisfied: $0.6 < (V2+V4)/V1 < 1.0$. Therefore, the chromatic aberration of the imaging capturing lens assembly can be corrected to improve the image quality.

According to the imaging capturing lens assembly of the present disclosure, the lens elements thereof can be made of plastic material or glass. When the lens element is made of glass material, the allocation of the refractive power of the imaging capturing lens assembly may be more flexible and easier to design. When the lens element is made of plastic material, the manufacturing cost can be effectively reduced. Furthermore, the surface of each lens element can be aspheric, so that it is easier to make the surface into non-spherical shapes. As a result, more controllable variables are obtained, the aberration is reduced, and the number of required lens elements can be reduced while constructing an optical system. Therefore, the total track length of the imaging capturing lens assembly can also be reduced.

According to the imaging capturing lens assembly of the present disclosure, when the lens element has a convex surface, it indicates that the paraxial region of the surface is convex; and when the lens element has a concave surface, it indicates that the paraxial region of the surface is concave.

According to the imaging capturing lens assembly of the present disclosure, the imaging capturing lens assembly can include at least one stop, such as an aperture stop, a glare stop or a field stop, to eliminate the stray light and thereby improve the image resolution thereof.

According to the imaging capturing lens assembly of the present disclosure, an aperture stop can be configured as a front stop or a middle stop. A front stop can provide a longer distance between an exit pupil of the system and an image plane and which improves the image-sensing efficiency of an image sensor. A middle stop is favorable for enlarging the field of view of the system and thereby provides a wider field of view for the same.

According to the above description of the present disclosure, the following 1st-10th specific embodiments are provided for further explanation.

1st Embodiment

Figure 2:
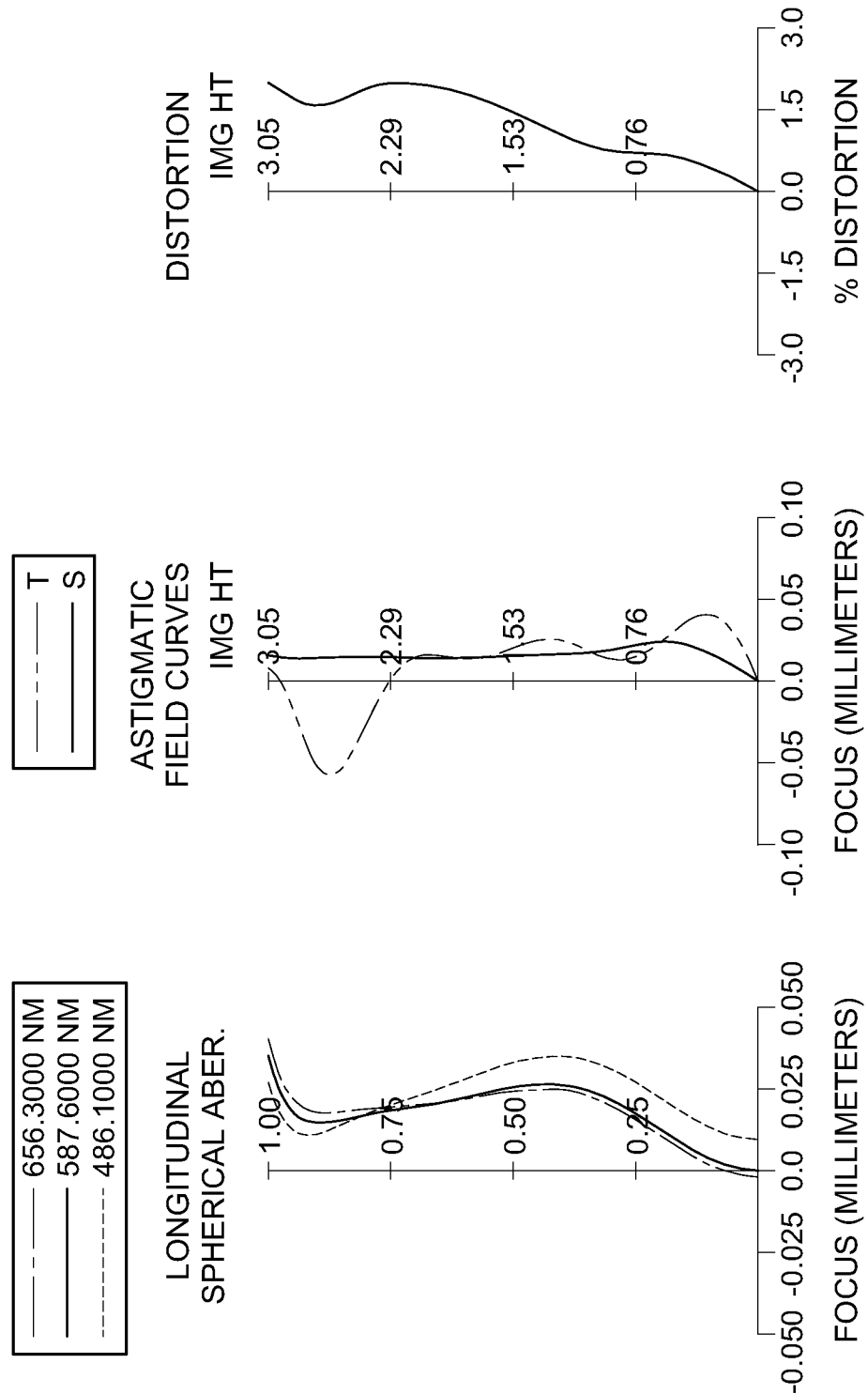
FIG. 2 shows spherical aberration curves, astigmatic field curves and a distortion curve of the imaging capturing lens assembly according to the 1st embodiment.

FIG. 1 is a schematic view of an imaging capturing lens assembly according to the 1st embodiment of the present disclosure. FIG. 2 shows spherical aberration curves, astigmatic field curves and a distortion curve of the imaging capturing lens assembly according to the 1st embodiment. In FIG. 1, the imaging capturing lens assembly includes, in order from an object side to an image side, an aperture stop 100, the first lens element 110, the second lens element 120, the third lens element 130, the fourth lens element 140, the fifth lens element 150, an IR-cut filter 160 and an image plane 170.

The first lens element 110 with positive refractive power has a convex object-side surface 111 and a convex image-side surface 112, and is made of plastic material. The object-side surface 111 and the image-side surface 112 of the first lens element 110 are aspheric.

The second lens element 120 with negative refractive power has a convex object-side surface 121 and a concave image-side surface 122, and is made of plastic material. The object-side surface 121 and the image-side surface 122 of the second lens element 120 are aspheric. Furthermore, the object-side surface 121 and the image-side surface 122 of the second lens element 120 both have at least one inflection point.

The third lens element 130 with positive refractive power has a concave object-side surface 131 and a convex image-side surface 132, and is made of plastic material. The object-side surface 131 and the image-side surface 132 of the third lens element 130 are aspheric.

The fourth lens element 140 with negative refractive power has a concave object-side surface 141 and a convex image-side surface 142, and is made of plastic material. The object-side surface 141 and the image-side surface 142 of the fourth lens element 140 are aspheric.

The fifth lens element 150 with positive refractive power has a convex object-side surface 151 and a concave image-side surface 152, and is made of plastic material. The object-side surface 151 and the image-side surface 152 of the fifth lens element 150 are aspheric. Furthermore, the object-side surface 151 and the image-side surface 152 of the fifth lens element 150 both have at least one inflection point.

The IR-cut filter 160 is made of glass and located between the fifth lens element 150 and the image plane 170, and will not affect the focal length of the imaging capturing lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i)$$

where:

X is the relative distance between a point on the aspheric surface spaced at a distance Y from the optical axis and the tangential plane at the aspheric surface vertex;

Y is the distance from the point on the curve of the aspheric surface to the optical axis;

R is the curvature radius of the lens elements;

k is the conic coefficient; and

Ai is the i-th aspheric coefficient.

In the imaging capturing lens assembly according to the 1st embodiment, when a focal length of the imaging capturing lens assembly is f, an f-number of the imaging capturing lens assembly is Fno, and a half of the maximal field of view is HFOV, these parameters have the following values: f=3.75 mm; Fno=2.20; and HFOV=38.5 degrees.

In the imaging capturing lens assembly according to the 1st embodiment, when the Abbe number of the first lens element 110 is V1, the Abbe number of the second lens element 120 is V2, and the Abbe number of the fourth lens element 140 is V4, the following relationships are satisfied: V2/V1=0.42 and (V2+V4)/V1=0.83.

In the imaging capturing lens assembly according to the 1st embodiment, when a curvature radius of the object-side surface 111 of the first lens element 110 is R1, and a curvature radius of an image-side surface 112 of the first lens element 110 is R2, a curvature radius of the object-side surface 121 of the second lens element 120 is R3, and a curvature radius of the image-side surface 122 of the second lens element 120 is R4, the following relationships are satisfied: (R1+R2)/(R1−R2)=0.04; R2/R3=−0.68; and R4/|R3|=0.41.

In the imaging capturing lens assembly according to the 1st embodiment, when an axial distance between the third lens element 130 and the fourth lens element 140 is T34, and an axial distance between the fourth lens element 140 and the fifth lens element 150 is T45, the following relationship is satisfied: T45/T34=0.11.

In the imaging capturing lens assembly according to the 1st embodiment, when a central thickness of the second lens element 120 is CT2, a central thickness of the fourth lens element 140 is CT4, and a central thickness of the fifth lens element 150 is CT5, the following relationship is satisfied: (CT2+CT4)/CT5=0.43.

In the imaging capturing lens assembly according to the 1st embodiment, when the focal length of the imaging capturing lens assembly is f, a focal length of the fourth lens element 140 is f4, and a focal length of the fifth lens element 150 is f5, the following relationships are satisfied: f/f4=−0.57 and |f/f4|+|f/f5|=0.75.

The detailed optical data of the 1st embodiment are shown in Table 1 and the aspheric surface data are shown in Table 2 below.

TABLE 1

1st Embodiment
f = 3.75 mm, Fno = 2.20, HFOV = 38.5 deg.

| Surface # |  | Curvature Radius |  | Thickness | Material | Index | Abbe # | Focal length |
|---|---|---|---|---|---|---|---|---|
| 0 | Object | Plano |  | Infinity |  |  |  |  |
| 1 | Ape. Stop | Plano |  | −0.095 |  |  |  |  |
| 2 | Lens 1 | 2.676 | (ASP) | 0.978 | Plastic | 1.544 | 55.9 | 2.54 |
| 3 |  | −2.489 | (ASP) | 0.030 |  |  |  |  |
| 4 | Lens 2 | 3.673 | (ASP) | 0.230 | Plastic | 1.640 | 23.3 | −4.09 |
| 5 |  | 1.492 | (ASP) | 0.513 |  |  |  |  |
| 6 | Lens 3 | −8.108 | (ASP) | 0.448 | Plastic | 1.544 | 55.9 | 6.42 |
| 7 |  | −2.490 | (ASP) | 0.274 |  |  |  |  |
| 8 | Lens 4 | −0.780 | (ASP) | 0.280 | Plastic | 1.640 | 23.3 | −6.60 |
| 9 |  | −1.091 | (ASP) | 0.030 |  |  |  |  |
| 10 | Lens 5 | 1.693 | (ASP) | 1.189 | Plastic | 1.544 | 55.9 | 20.12 |
| 11 |  | 1.506 | (ASP) | 0.600 |  |  |  |  |
| 12 | IR-cut filter | Plano |  | 0.300 | Glass | 1.517 | 64.2 | — |
| 13 |  | Plano |  | 0.282 |  |  |  |  |
| 14 | Image | Plano |  | — |  |  |  |  |

Note:
Reference wavelength (d-line) is 587.6 nm.

TABLE 2

Aspheric Coefficients

| | Surface # | | | | |
|---|---|---|---|---|---|
| | 2 | 3 | 4 | 5 | 6 |
| k = | −8.8499E−01 | −1.0972E+01 | −5.7952E+01 | −7.7154E+00 | −5.7732E+01 |
| A4 = | −2.2371E−02 | −9.2013E−02 | −9.0862E−02 | −1.5577E−02 | −7.8776E−02 |

TABLE 2-continued

| Aspheric Coefficients | | | | | |
|---|---|---|---|---|---|
| A6 =  | −1.6360E−02 | 8.5053E−02  | 1.2694E−01  | 1.0531E−02  | −5.0649E−02 |
| A8 =  | −1.6308E−02 | −8.6067E−02 | 6.0829E−03  | 1.6045E−01  | 1.0507E−02  |
| A10 = | −2.2612E−02 | −9.4672E−03 | −1.2404E−01 | −2.5789E−01 | 1.4442E−02  |
| A12 = | 6.9756E−02  | 2.6580E−02  | 4.9930E−02  | 1.6011E−01  | 1.4734E−02  |
| A14 = | −6.0040E−02 | −7.2912E−03 | 4.0711E−03  | −4.3749E−02 | 6.0069E−02  |
| A16 = | —           | —           | —           | —           | −4.7295E−02 |

| | Surface # | | | | |
|---|---|---|---|---|---|
| | 7 | 8 | 9 | 10 | 11 |
| k =   | 2.2950E+00  | −4.2357E+00 | −7.3216E−01 | −2.1261E+01 | −6.4122E+00 |
| A4 =  | −2.4758E−02 | −5.9661E−02 | 1.4377E−01  | −1.2594E−01 | −4.7792E−02 |
| A6 =  | −3.0977E−02 | −1.6763E−02 | −4.1937E−02 | 6.6312E−02  | 1.9783E−02  |
| A8 =  | 2.2024E−02  | 1.2070E−01  | 2.1059E−02  | −4.1291E−02 | −8.1064E−03 |
| A10 = | 3.0814E−02  | −4.8537E−02 | 9.6050E−03  | 2.1031E−02  | 2.2573E−03  |
| A12 = | −3.0867E−03 | −7.4333E−03 | −3.2027E−03 | −5.8885E−03 | −3.9239E−04 |
| A14 = | −7.1167E−05 | 2.8314E−03  | −2.6044E−03 | 8.2423E−04  | 3.7206E−05  |
| A16 = | −8.1514E−04 | 8.2295E−04  | 7.8235E−04  | −4.6070E−05 | −1.4456E−06 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 also applies to the Tables of the remaining embodiments, and so an explanation in this regard will not be provided again.

2nd Embodiment

Figure 3:
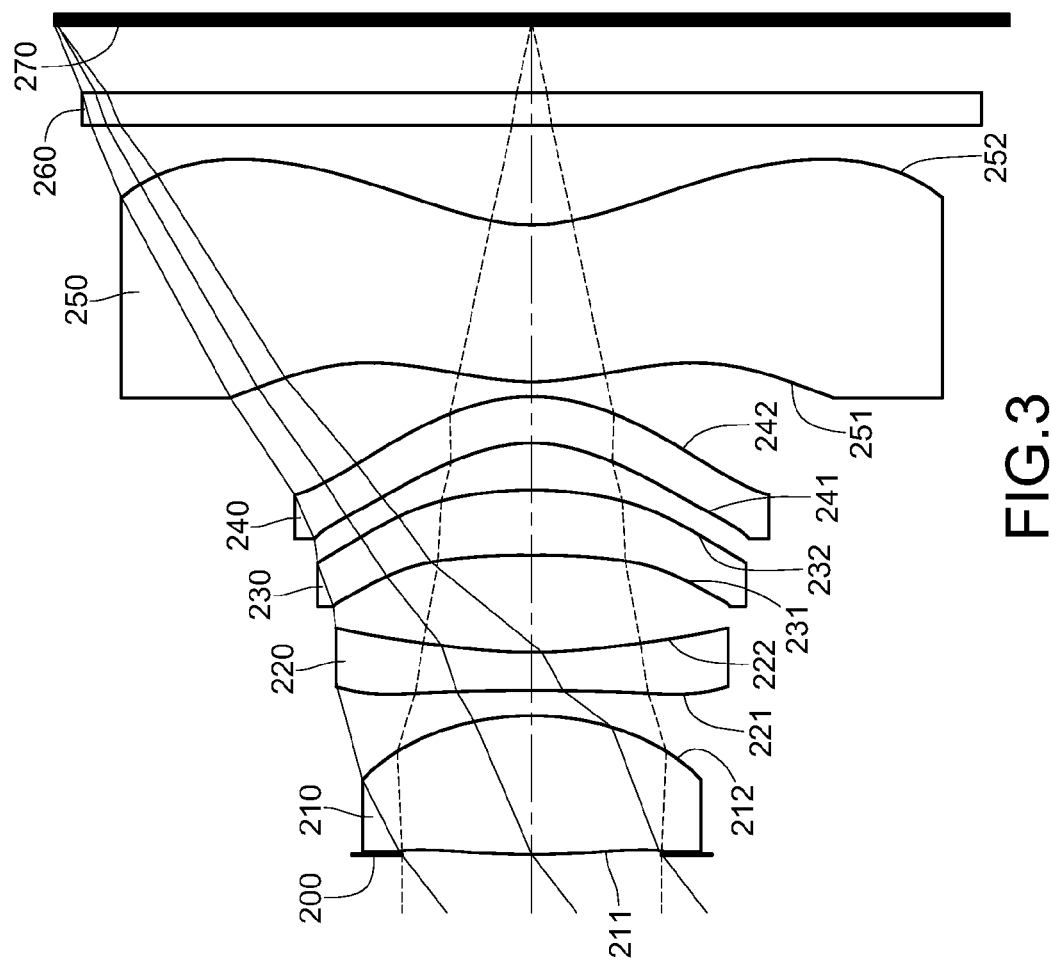
FIG. 3 is a schematic view of an imaging capturing lens assembly according to the 2nd embodiment of the present disclosure.
Figure 4:
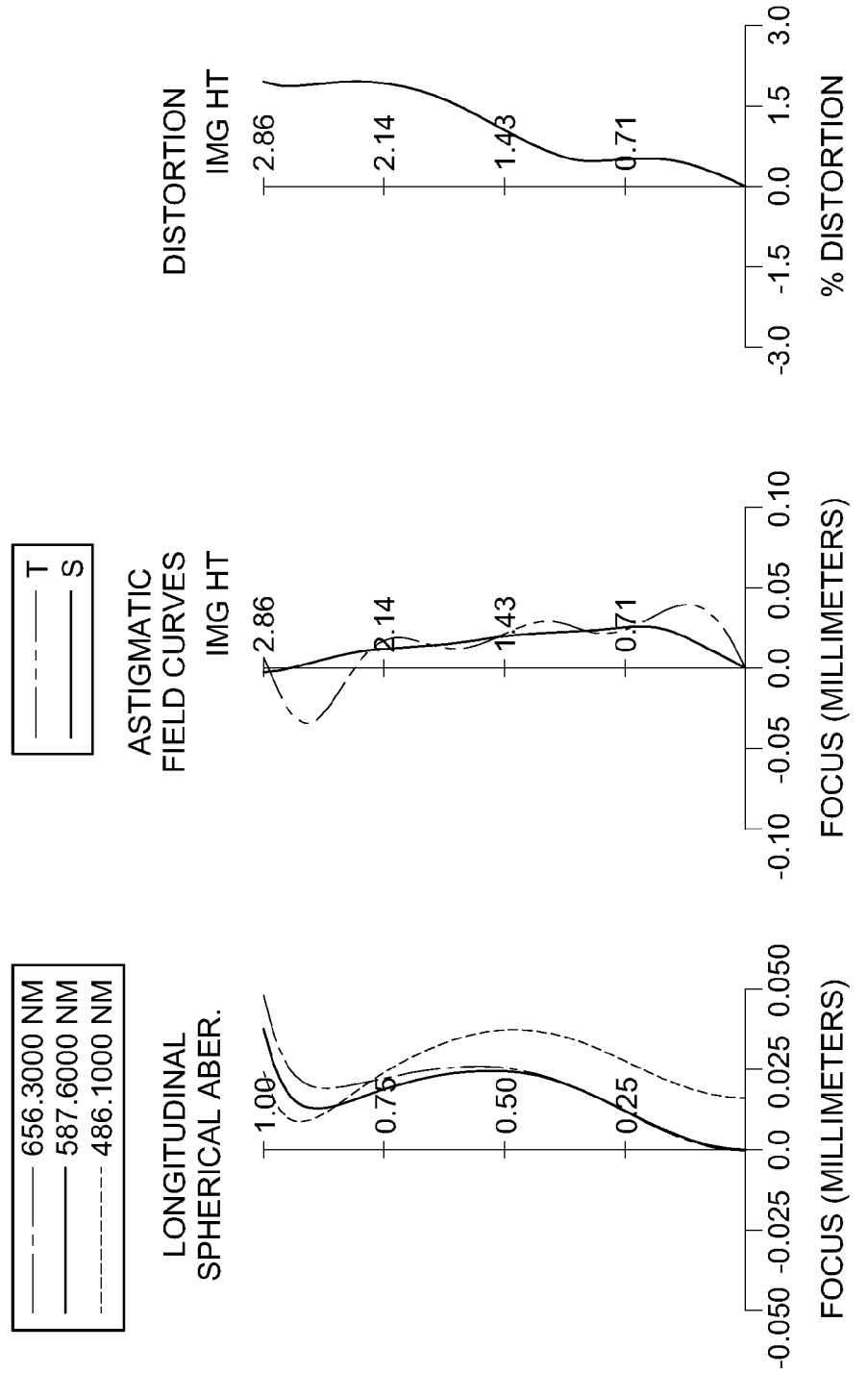
FIG. 4 shows spherical aberration curves, astigmatic field curves and a distortion curve of the imaging capturing lens assembly according to the 2nd embodiment.

FIG. 3 is a schematic view of an imaging capturing lens assembly according to the 2nd embodiment of the present disclosure. FIG. 4 shows spherical aberration curves, astigmatic field curves and a distortion curve of the imaging capturing lens assembly according to the 2nd embodiment. In FIG. 3, the imaging capturing lens assembly includes, in order from an object side to an image side, an aperture stop 200, the first lens element 210, the second lens element 220, the third lens element 230, the fourth lens element 240, the fifth lens element 250, an IR-cut filter 260 and an image plane 270.

The first lens element 210 with positive refractive power has a convex object-side surface 211 and a convex image-side surface 212, and is made of plastic material. The object-side surface 211 and the image-side surface 212 of the first lens element 210 are aspheric.

The second lens element 220 with negative refractive power has a concave object-side surface 221 and a concave image-side surface 222, and is made of plastic material. The object-side surface 221 and the image-side surface 222 of the second lens element 220 are aspheric. Furthermore, the object-side surface 221 and the image-side surface 222 of the second lens element 220 both have at least one inflection point.

The third lens element 230 with positive refractive power has a concave object-side surface 231 and a convex image-side surface 232, and is made of plastic material. The object-side surface 231 and the image-side surface 232 of the third lens element 230 are aspheric.

The fourth lens element 240 with negative refractive power has a concave object-side surface 241 and a convex image-side surface 242, and is made of plastic material. The object-side surface 241 and the image-side surface 242 of the fourth lens element 240 are aspheric.

The fifth lens element 250 with negative refractive power has a convex object-side surface 251 and a concave image-side surface 252, and is made of plastic material. The object-side surface 251 and the image-side surface 252 of the fifth lens element 250 are aspheric. Furthermore, the object-side surface 251 and the image-side surface 252 of the fifth lens element 250 both have at least one inflection point.

The IR-cut filter 260 is made of glass and located between the fifth lens element 250 and the image plane 270, and will not affect the focal length of the imaging capturing lens assembly.

The detailed optical data of the 2nd embodiment are shown in Table 3 and the aspheric surface data are shown in Table 4 below.

TABLE 3

2nd Embodiment
f = 3.60 mm, Fno = 2.30, HFOV = 37.7 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | 0.001 | | | | |
| 2 | Lens 1 | 4.543 | (ASP) | 0.838 | Plastic | 1.544 | 55.9 | 2.43 |
| 3 | | −1.742 | (ASP) | 0.151 | | | | |
| 4 | Lens 2 | −45.662 | (ASP) | 0.230 | Plastic | 1.650 | 21.4 | −4.17 |
| 5 | | 2.885 | (ASP) | 0.588 | | | | |
| 6 | Lens 3 | −5.769 | (ASP) | 0.392 | Plastic | 1.544 | 55.9 | 7.67 |
| 7 | | −2.480 | (ASP) | 0.284 | | | | |
| 8 | Lens 4 | −0.872 | (ASP) | 0.280 | Plastic | 1.650 | 21.4 | −12.26 |

TABLE 3-continued

2nd Embodiment
f = 3.60 mm, Fno = 2.30, HFOV = 37.7 deg.

| Surface # | | Curvature Radius | | Thickness | Material | Index | Abbe # | Focal length |
|---|---|---|---|---|---|---|---|---|
| 9 | | −1.102 | (ASP) | 0.088 | | | | |
| 10 | Lens 5 | 1.461 | (ASP) | 0.946 | Plastic | 1.535 | 56.3 | −112.84 |
| 11 | | 1.105 | (ASP) | 0.600 | | | | |
| 12 | IR-cut filter | Plano | | 0.200 | Glass | 1.517 | 64.2 | — |
| 13 | | Plano | | 0.403 | | | | |
| 14 | Image | Plano | | — | | | | |

Note:
Reference wavelength (d-line) is 587.6 nm.

TABLE 4

Aspheric Coefficients

| | Surface # | | | | |
|---|---|---|---|---|---|
| | 2 | 3 | 4 | 5 | 6 |
| k = | −1.6869E+01 | −6.2120E+00 | −7.0000E+01 | −1.9540E+01 | −6.1519E+00 |
| A4 = | −5.6025E−02 | −1.6437E−01 | −1.0276E−01 | −3.3913E−02 | −7.2158E−02 |
| A6 = | −4.7769E−02 | 6.7380E−02 | 1.1481E−01 | −2.8809E−02 | −4.4879E−02 |
| A8 = | −4.1609E−02 | −5.2712E−02 | 2.3018E−02 | 1.6042E−01 | −2.0486E−02 |
| A10 = | −5.1174E−02 | −1.4612E−02 | −8.9465E−02 | −2.3609E−01 | −9.0022E−03 |
| A12 = | 1.4480E−01 | 3.1936E−02 | 6.9856E−02 | 1.7294E−01 | 8.5886E−03 |
| A14 = | −1.3863E−01 | −1.6681E−02 | −1.9530E−02 | −4.9026E−02 | 6.4189E−02 |
| A16 = | — | — | — | — | −3.6022E−02 |

| | Surface # | | | | |
|---|---|---|---|---|---|
| | 7 | 8 | 9 | 10 | 11 |
| k = | 1.6386E+00 | −4.6571E+00 | −6.6918E−01 | −1.2892E+01 | −5.0252E+00 |
| A4 = | −3.2871E−02 | −8.2801E−02 | 1.4368E−01 | −1.0867E−01 | −5.1756E−02 |
| A6 = | −4.2346E−02 | −3.2898E−02 | −5.0438E−02 | 5.7136E−02 | 2.2054E−02 |
| A8 = | 1.5883E−02 | 1.1844E−01 | 1.6954E−02 | −4.2967E−02 | −8.9108E−03 |
| A10 = | 2.8732E−02 | −4.5878E−02 | 9.2086E−02 | 2.1405E−02 | 2.3408E−03 |
| A12 = | −4.2298E−03 | −5.5154E−03 | −2.6803E−03 | −5.7943E−03 | −3.7739E−04 |
| A14 = | −1.0742E−03 | 2.8356E−03 | −2.2884E−03 | 8.2591E−04 | 3.3410E−05 |
| A16 = | −1.3650E−03 | −9.9861E−05 | 8.6101E−04 | −4.9856E−05 | −1.2457E−06 |

In the imaging capturing lens assembly according to the 2nd embodiment, the definitions of f, Fno, HFOV, V1, V2, V4, R1, R2, R3, R4, T34, T45, CT2, CT4, CT5, f4 and f5 are the same as those stated in the 1st embodiment with corresponding values for the 2nd embodiment. Moreover, these parameters can be calculated from Table 3 and Table 4 as the following values and satisfy the following relationships:

| f (mm) | 3.60 | R2/R3 | 0.04 |
|---|---|---|---|
| Fno | 2.30 | R4/|R3| | 0.06 |
| HFOV (deg.) | 37.7 | T45/T34 | 0.31 |
| V2/V1 | 0.38 | (CT2 + CT4)/CT5 | 0.54 |
| (V2 + V4)/V1 | 0.77 | f/f4 | −0.29 |
| (R1 + R2)/(R1 − R2) | 0.45 | |f/f4| + |f/f5| | 0.33 |

3rd Embodiment

Figure 5:
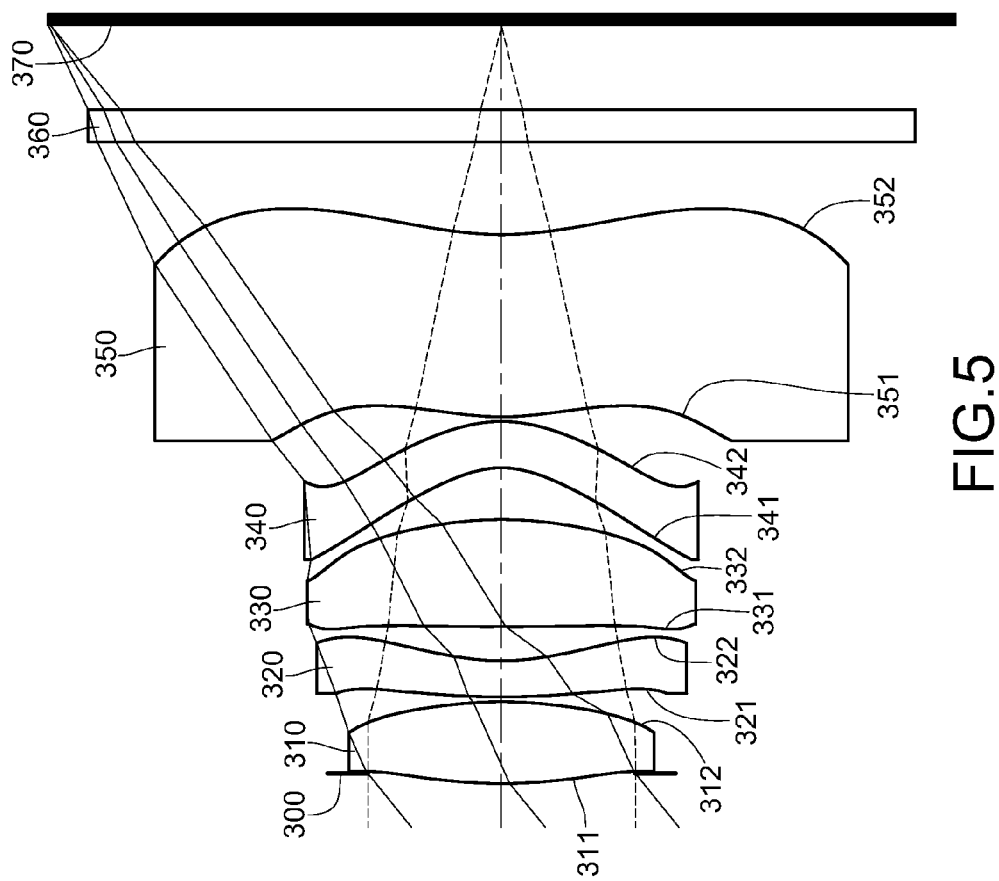
FIG. 5 is a schematic view of an imaging capturing lens assembly according to the 3rd embodiment of the present disclosure.
Figure 6:
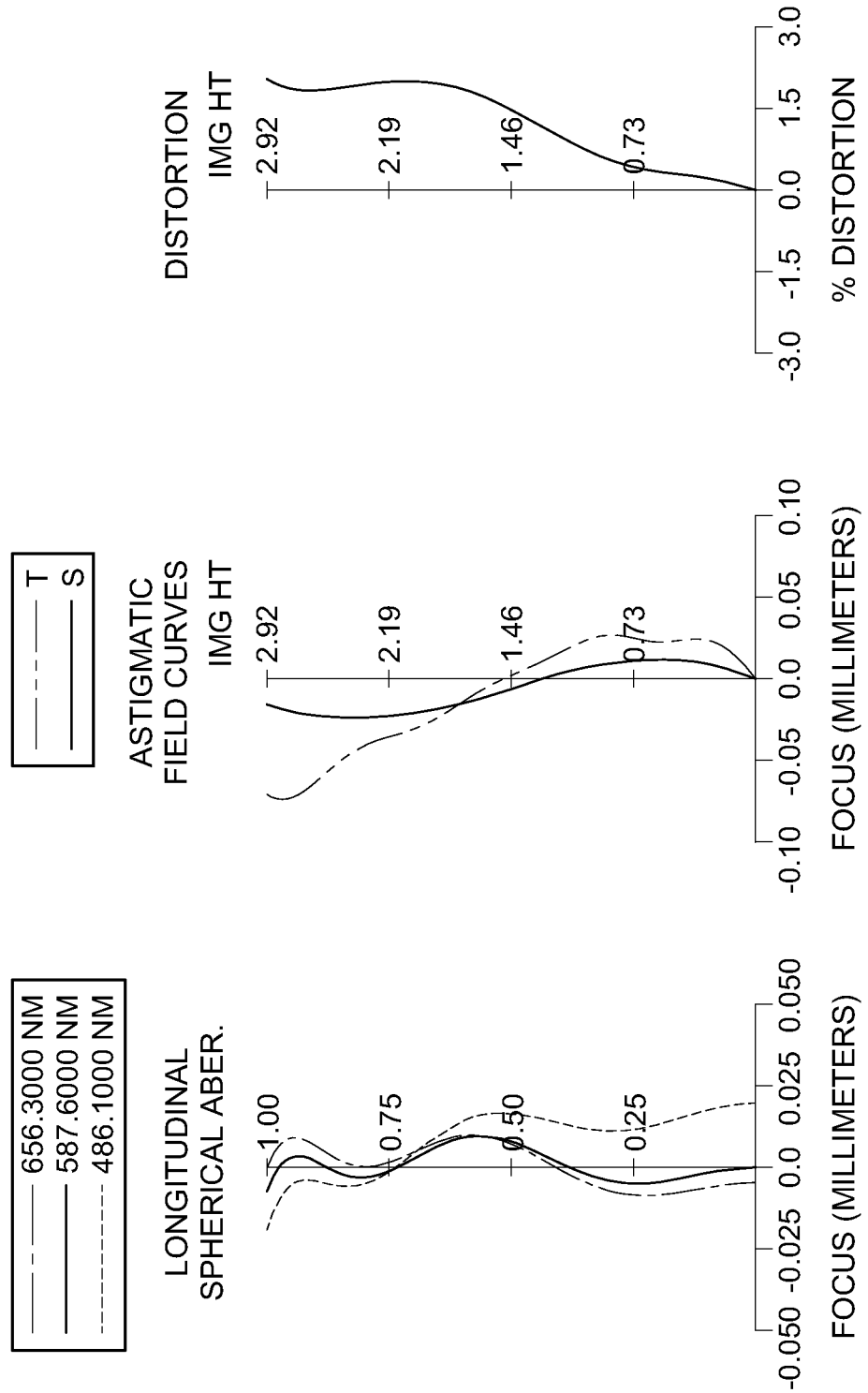
FIG. 6 shows spherical aberration curves, astigmatic field curves and a distortion curve of the imaging capturing lens assembly according to the 3rd embodiment.

FIG. 5 is a schematic view of an imaging capturing lens assembly according to the 3rd embodiment of the present disclosure. FIG. 6 shows spherical aberration curves, astigmatic field curves and a distortion curve of the imaging capturing lens assembly according to the 3rd embodiment. In FIG. 5, the imaging capturing lens assembly includes, in order from an object side to an image side, an aperture stop 300, the first lens element 310, the second lens element 320, the third lens element 330, the fourth lens element 340, the fifth lens element 350, an IR-cut filter 360 and an image plane 370.

The first lens element 310 with positive refractive power has a convex object-side surface 311 and a convex image-side surface 312, and is made of plastic material. The object-side surface 311 and the image-side surface 312 of the first lens element 310 are aspheric.

The second lens element 320 with negative refractive power has a convex object-side surface 321 and a concave image-side surface 322, and is made of plastic material. The object-side surface 321 and the image-side surface 322 of the second lens element 320 are aspheric. Furthermore, the object-side surface 321 and the image-side surface 322 of the second lens element 320 both have at least one inflection point.

The third lens element 330 with positive refractive power has a convex object-side surface 331 and a convex image-side surface 332, and is made of plastic material. The object-side surface 331 and the image-side surface 332 of the third lens element 330 are aspheric.

The fourth lens element 340 with negative refractive power has a concave object-side surface 341 and a convex image-side surface 342, and is made of plastic material. The object-side surface 341 and the image-side surface 342 of the fourth lens element 340 are aspheric.

The fifth lens element 350 with positive refractive power has a convex object-side surface 351 and a concave image-side surface 352, and is made of plastic material. The object-side surface 351 and the image-side surface 352 of the fifth lens element 350 are aspheric. Furthermore, the object-side surface 351 and the image-side surface 352 of the fifth lens element 350 both have at least one inflection point.

The IR-cut filter 360 is made of glass and located between the fifth lens element 350 and the image plane 370, and will not affect the focal length of the imaging capturing lens assembly.

The detailed optical data of the 3rd embodiment are shown in Table 5 and the aspheric surface data are shown in Table 6 below.

In the imaging capturing lens assembly according to the 3rd embodiment, the definitions of f, Fno, HFOV, V1, V2, V4, R1, R2, R3, R4, T34, T45, CT2, CT4, CT5, f4 and f5 are the same as those stated in the 1st embodiment with corresponding values for the 3rd embodiment. Moreover, these parameters can be calculated from Table 5 and Table 6 as the following values and satisfy the following relationships:

| | | | |
|---|---|---|---|
| f (mm) | 3.54 | R2/R3 | −0.52 |
| Fno | 2.04 | R4/|R3| | 0.32 |
| HFOV (deg.) | 39.0 | T45/T34 | 0.09 |
| V2/V1 | 0.43 | (CT2 + CT4)/CT5 | 0.45 |
| (V2 + V4)/V1 | 0.87 | f/f4 | −0.76 |
| (R1 + R2)/(R1 − R2) | 0.12 | |f/f4| + |f/f5| | 1.12 |

TABLE 5

3rd Embodiment
f = 3.54 mm, Fno = 2.04, HFOV = 39.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.065 | | | | |
| 2 | Lens 1 | 3.133 | (ASP) | 0.531 | Plastic | 1.565 | 55.0 | 2.52 |
| 3 | | −2.454 | (ASP) | 0.030 | | | | |
| 4 | Lens 2 | 4.734 | (ASP) | 0.235 | Plastic | 1.634 | 23.8 | −3.61 |
| 5 | | 1.514 | (ASP) | 0.220 | | | | |
| 6 | Lens 3 | 14.827 | (ASP) | 0.696 | Plastic | 1.544 | 55.9 | 3.91 |
| 7 | | −2.444 | (ASP) | 0.336 | | | | |
| 8 | Lens 4 | −0.601 | (ASP) | 0.300 | Plastic | 1.634 | 23.8 | −4.64 |
| 9 | | −0.901 | (ASP) | 0.030 | | | | |
| 10 | Lens 5 | 1.752 | (ASP) | 1.181 | Plastic | 1.544 | 55.9 | 9.86 |
| 11 | | 1.983 | (ASP) | 0.600 | | | | |
| 12 | IR-cut filter | Plano | | 0.210 | Glass | 1.517 | 64.2 | — |
| 13 | | Plano | | 0.550 | | | | |
| 14 | Image | Plano | | — | | | | |

Note:
Reference wavelength (d-line) is 587.6 nm.

TABLE 6

Aspheric Coefficients

| | Surface # | | | | |
|---|---|---|---|---|---|
| | 2 | 3 | 4 | 5 | 6 |
| k = | −3.1508E+01 | −1.0000E+00 | 1.7858E+00 | −1.1389E+01 | −4.1404E+01 |
| A4 = | 8.9011E−02 | 2.1071E−01 | −7.5130E−02 | −3.0323E−02 | −4.3731E−02 |
| A6 = | −2.0305E−01 | −3.9973E−01 | 2.2997E−01 | 1.6819E−01 | 3.3496E−02 |
| A8 = | 1.9021E−01 | 2.6842E−01 | −6.2862E−01 | −4.6482E−01 | 3.1601E−02 |
| A10 = | −1.1567E−01 | 4.2832E−02 | 8.0487E−01 | 5.0611E−01 | −1.8720E−01 |
| A12 = | −4.5016E−02 | −2.3753E−01 | −5.1372E−01 | −2.8887E−01 | 1.6746E−01 |
| A14 = | 4.3478E−02 | 1.1066E−01 | 1.1842E−01 | 6.7151E−02 | −4.1010E−02 |

| | Surface # | | | | |
|---|---|---|---|---|---|
| | 7 | 8 | 9 | 10 | 11 |
| k = | −1.8601E−01 | −3.5651E+00 | −5.6340E+00 | −8.6713E+00 | −1.4379E+01 |
| A4 = | 4.0629E−02 | −1.8384E−01 | −3.5164E−01 | −2.9461E−01 | −2.0408E−02 |
| A6 = | 1.5041E−02 | 7.2094E−01 | 8.3352E−01 | 4.1630E−01 | −2.4526E−03 |
| A8 = | −8.4633E−02 | −1.5293E+00 | −1.2185E+00 | −5.2937E−01 | −4.3724E−04 |
| A10 = | 3.0467E−02 | 1.6268E+00 | 9.7789E−01 | 4.1433E−01 | 7.4719E−04 |
| A12 = | −1.8286E−02 | −8.2546E−01 | −3.6412E−01 | −1.9356E−01 | −2.5650E−04 |
| A14 = | 1.2014E−02 | 1.6061E−01 | 5.0556E−02 | 4.9645E−02 | 3.7220E−05 |
| A16 = | — | — | — | −5.2863E−03 | −2.0741E−06 |

4th Embodiment

Figure 7:
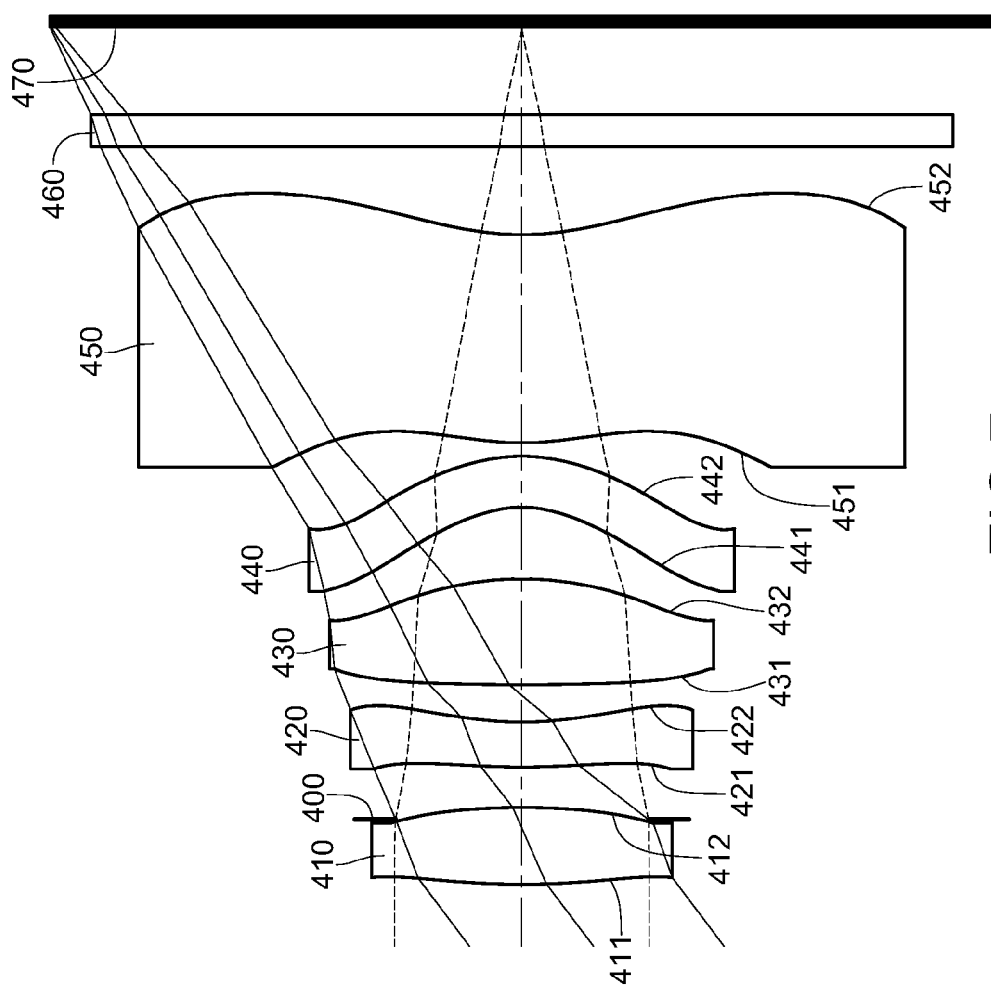
FIG. 7 is a schematic view of an imaging capturing lens assembly according to the 4th embodiment of the present disclosure.
Figure 8:
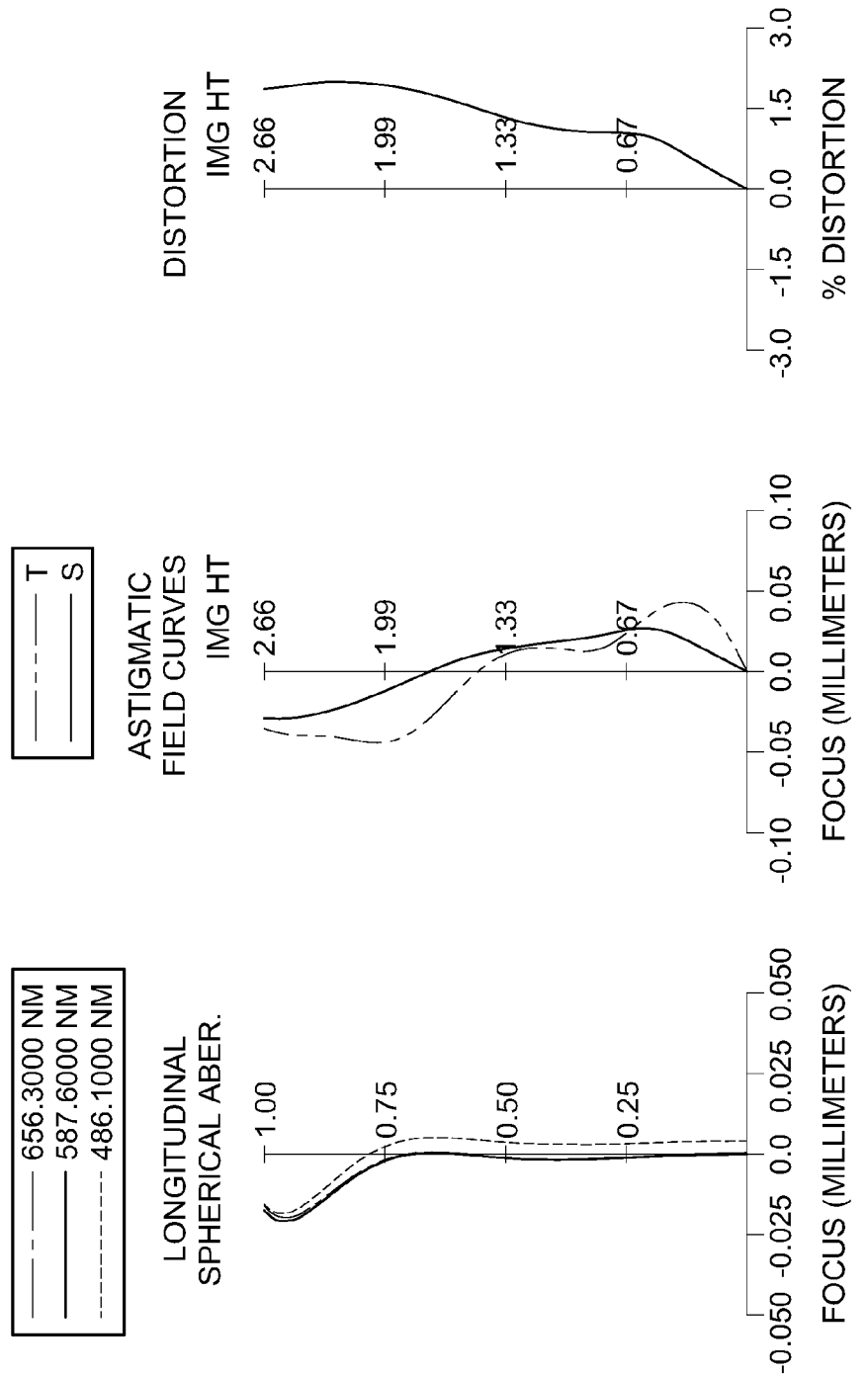
FIG. 8 shows spherical aberration curves, astigmatic field curves and a distortion curve of the imaging capturing lens assembly according to the 4th embodiment.

FIG. 7 is a schematic view of an imaging capturing lens assembly according to the 4th embodiment of the present disclosure. FIG. 8 shows spherical aberration curves, astigmatic field curves and a distortion curve of the imaging capturing lens assembly according to the 4th embodiment. In FIG. 7, the imaging capturing lens assembly includes, in order from an object side to an image side, the first lens element 410, an aperture stop 400, the second lens element 420, the third lens element 430, the fourth lens element 440, the fifth lens element 450, an IR-cut filter 460 and an image plane 470.

The first lens element 410 with positive refractive power has a convex object-side surface 411 and a convex image-side surface 412, and is made of plastic material. The object-side surface 411 and the image-side surface 412 of the first lens element 410 are aspheric.

The second lens element 420 with negative refractive power has a convex object-side surface 421 and a concave image-side surface 422, and is made of plastic material. The object-side surface 421 and the image-side surface 422 of the second lens element 420 are aspheric. Furthermore, the object-side surface 421 and the image-side surface 422 of the second lens element 420 both have at least one inflection point.

The third lens element 430 with positive refractive power has a convex object-side surface 431 and a convex image-side surface 432, and is made of plastic material. The object-side surface 431 and the image-side surface 432 of the third lens element 430 are aspheric.

The fourth lens element 440 with negative refractive power has a concave object-side surface 441 and a convex image-side surface 442, and is made of plastic material. The object-side surface 441 and the image-side surface 442 of the fourth lens element 440 are aspheric.

The fifth lens element 450 with positive refractive power has a convex object-side surface 451 and a concave image-side surface 452, and is made of plastic material. The object-side surface 451 and the image-side surface 452 of the fifth lens element 450 are aspheric. Furthermore, the object-side surface 451 and the image-side surface 452 of the fifth lens element 450 both have at least one inflection point.

The IR-cut filter 460 is made of glass and located between the fifth lens element 450 and the image plane 470, and will not affect the focal length of the imaging capturing lens assembly.

The detailed optical data of the 4th embodiment are shown in Table 7 and the aspheric surface data are shown in Table 8 below.

TABLE 7

4th Embodiment
f = 3.46 mm, Fno = 2.40, HFOV = 37.1 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 4.131 | (ASP) | 0.435 | Plastic | 1.544 | 55.9 | 3.83 |
| 2 | | −4.050 | (ASP) | −0.067 | | | | |
| 3 | Ape. Stop | Plano | | 0.296 | | | | |
| 4 | Lens 2 | 4.406 | (ASP) | 0.254 | Plastic | 1.634 | 23.8 | −5.76 |
| 5 | | 1.952 | (ASP) | 0.211 | | | | |
| 6 | Lens 3 | 13.075 | (ASP) | 0.599 | Plastic | 1.544 | 55.9 | 2.98 |
| 7 | | −1.823 | (ASP) | 0.406 | | | | |
| 8 | Lens 4 | −0.633 | (ASP) | 0.288 | Plastic | 1.633 | 23.4 | −4.41 |
| 9 | | −0.964 | (ASP) | 0.076 | | | | |
| 10 | Lens 5 | 1.646 | (ASP) | 1.177 | Plastic | 1.535 | 56.3 | 15.81 |
| 11 | | 1.534 | (ASP) | 0.500 | | | | |
| 12 | IR-cut filter | Plano | | 0.180 | Glass | 1.517 | 64.2 | — |
| 13 | | Plano | | 0.494 | | | | |
| 14 | Image | Plano | | — | | | | |

Note:
Reference wavelength (d-line) is 587.6 nm.

TABLE 8

Aspheric Coefficients

| | Surface # | | | | |
|---|---|---|---|---|---|
| | 1 | 2 | 4 | 5 | 6 |
| k = | −3.0000E+01 | −1.0000E+00 | −2.8609E+01 | 1.6525E+00 | −3.0000E+01 |
| A4 = | 1.5420E−03 | −3.4122E−02 | −9.1422E−02 | −2.3490E−01 | −1.5187E−02 |
| A6 = | −5.7925E−02 | −6.7764E−02 | −1.2279E−01 | 1.4059E−01 | 1.4679E−02 |
| A8 = | −1.4345E−02 | 8.5359E−02 | 1.1380E−01 | −4.2767E−01 | 9.2641E−02 |
| A10 = | −8.3512E−02 | −2.8137E−01 | 8.5734E−02 | 5.8599E−01 | −8.2279E−02 |
| A12 = | 1.5159E−01 | 3.4926E−01 | −4.3376E−01 | −4.9352E−01 | 2.1675E−02 |
| A14 = | −1.2078E−01 | −1.7695E−01 | 2.4326E−01 | 1.5163E−01 | 1.1947E−03 |

TABLE 8-continued

Aspheric Coefficients

| Surface # | | | | |
|---|---|---|---|---|
| 7 | 8 | 9 | 10 | 11 |
| k = −3.7600E+00 | −3.3698E+00 | −6.2148E+00 | −2.1619E+00 | −6.3091E−01 |
| A4 = −2.2489E−02 | 9.8059E−02 | −2.2270E−01 | −4.3219E−01 | −2.2773E−01 |
| A6 = −1.9257E−01 | −9.8523E−01 | −4.1119E−02 | 2.7235E−01 | 1.0787E−01 |
| A8 = 3.3819E−01 | 1.9730E+00 | 3.2252E−01 | −9.1262E−02 | −4.4056E−02 |
| A10 = −1.3593E−01 | −1.6158E+00 | −1.9292E−01 | −8.0333E−03 | 1.2123E−02 |
| A12 = 1.5050E−02 | 6.2442E−01 | 4.5836E−02 | 1.7727E−02 | −2.1565E−03 |
| A14 = −6.3429E−04 | −9.7833E−02 | −4.2097E−03 | −4.9193E−03 | 2.1981E−04 |
| A16 = — | — | — | 4.2567E−04 | −9.8844E−06 |

In the imaging capturing lens assembly according to the 4th embodiment, the definitions of f, Fno, HFOV, V1, V2, V4, R1, R2, R3, R4, T34, T45, CT2, CT4, CT5, f4 and f5 are the same as those stated in the 1st embodiment with corresponding values for the 4th embodiment. Moreover, these parameters can be calculated from Table 7 and Table 8 as the following values and satisfy the following relationships:

| | | | |
|---|---|---|---|
| f (mm) | 3.46 | R2/R3 | −0.92 |
| Fno | 2.40 | R4/|R3| | 0.44 |
| HFOV (deg.) | 37.1 | T45/T34 | 0.19 |
| V2/V1 | 0.43 | (CT2 + CT4)/CT5 | 0.46 |
| (V2 + V4)/V1 | 0.84 | f/f4 | −0.78 |
| (R1 + R2)/(R1 − R2) | 0.01 | |f/f4| + |f/f5| | 1.00 |

5th Embodiment

Figure 9:
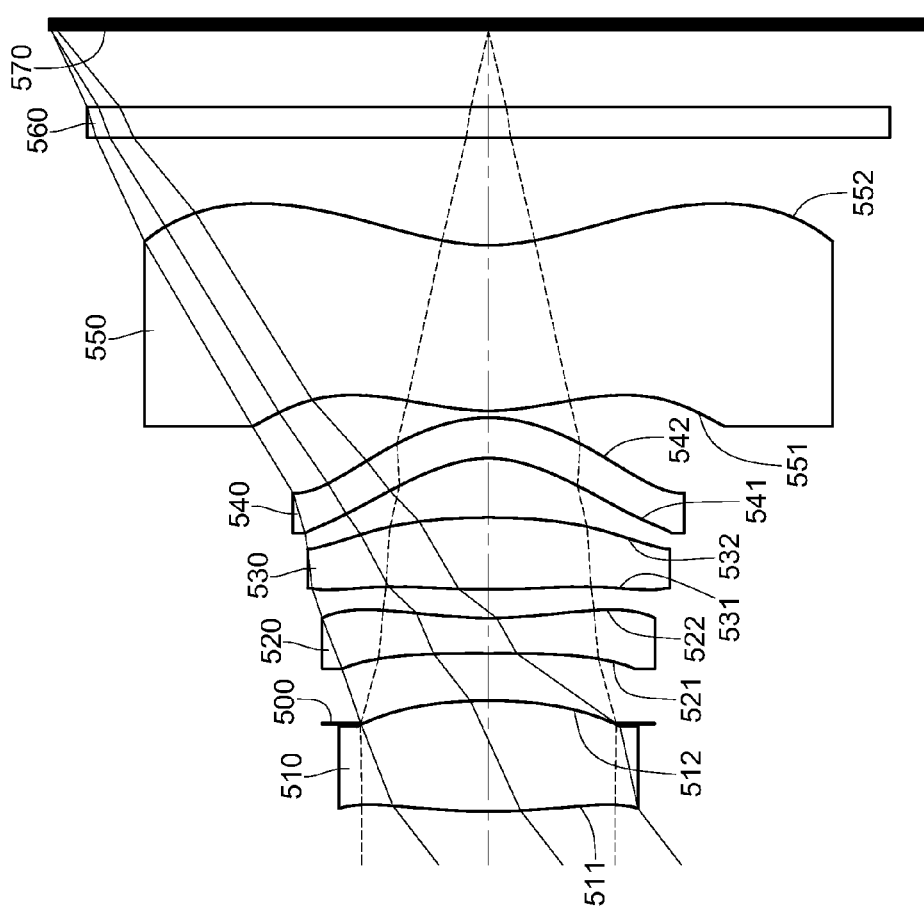
FIG. 9 is a schematic view of an imaging capturing lens assembly according to the 5th embodiment of the present disclosure.
Figure 10:
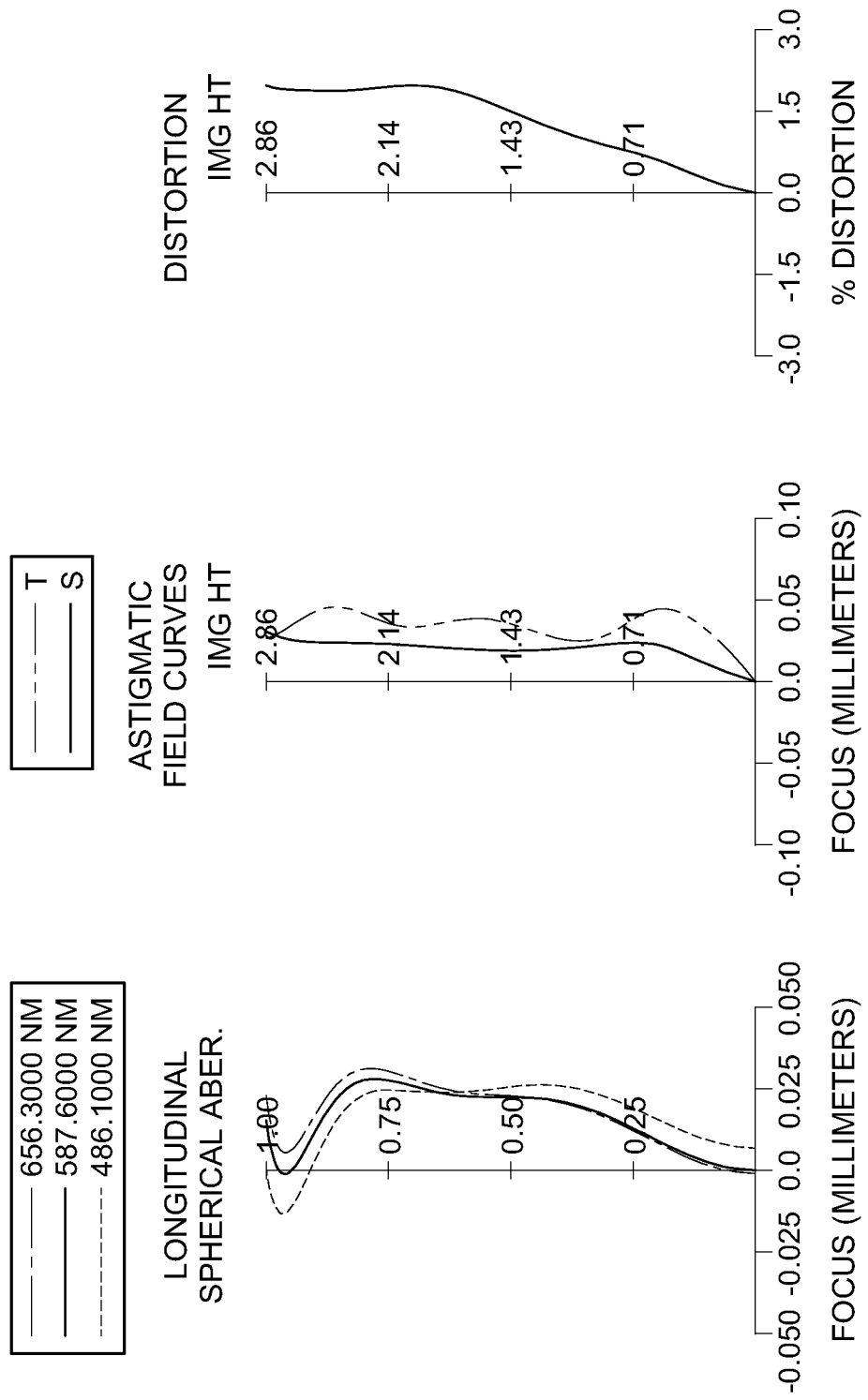
FIG. 10 shows spherical aberration curves, astigmatic field curves and a distortion curve of the imaging capturing lens assembly according to the 5th embodiment.

FIG. 9 is a schematic view of an imaging capturing lens assembly according to the 5th embodiment of the present disclosure. FIG. 10 shows spherical aberration curves, astigmatic field curves and a distortion curve of the imaging capturing lens assembly according to the 5th embodiment. In FIG. 9, the imaging capturing lens assembly includes, in order from an object side to an image side, the first lens element 510, an aperture stop 500, the second lens element 520, the third lens element 530, the fourth lens element 540, the fifth lens element 550, an IR-cut filter 560 and an image plane 570.

The first lens element 510 with positive refractive power has a convex object-side surface 511 and a convex image-side surface 512, and is made of plastic. The object-side surface 511 and the image-side surface 512 of the first lens element 510 are aspheric.

The second lens element 520 with negative refractive power has a concave object-side surface 521 and a concave image-side surface 522, and is made of plastic material. The object-side surface 521 and the image-side surface 522 of the second lens element 520 are aspheric. Furthermore, the image-side surface 522 of the second lens element 520 has at least one inflection point.

The third lens element 530 with positive refractive power has a convex object-side surface 531 and a convex image-side surface 532, and is made of plastic material. The object-side surface 531 and the image-side surface 532 of the third lens element 530 are aspheric.

The fourth lens element 540 with negative refractive power has a concave object-side surface 541 and a convex image-side surface 542, and is made of plastic material. The object-side surface 541 and the image-side surface 542 of the fourth lens element 540 are aspheric.

The fifth lens element 550 with positive refractive power has a convex object-side surface 551 and a concave image-side surface 552, and is made of plastic material. The object-side surface 551 and the image-side surface 552 of the fifth lens element 550 are aspheric. Furthermore, the object-side surface 551 and the image-side surface 552 of the fifth lens element 550 both have at least one inflection point.

The IR-cut filter 560 is made of glass and located between the fifth lens element 550 and the image plane 570, and will not affect the focal length of the imaging capturing lens assembly.

The detailed optical data of the 5th embodiment are shown in Table 9 and the aspheric surface data are shown in Table 10 below.

TABLE 9

5th Embodiment
f = 3.60 mm, Fno = 2.18, HFOV = 37.7 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 4.113 | (ASP) | 0.724 | Plastic | 1.544 | 55.9 | 3.29 |
| 2 | | −2.968 | (ASP) | −0.152 | | | | |
| 3 | Ape. Stop | Plano | | 0.460 | | | | |
| 4 | Lens 2 | −100.000 | (ASP) | 0.230 | Plastic | 1.640 | 23.3 | −4.10 |
| 5 | | 2.696 | (ASP) | 0.188 | | | | |
| 6 | Lens 3 | 5.705 | (ASP) | 0.469 | Plastic | 1.535 | 56.3 | 4.65 |
| 7 | | −4.287 | (ASP) | 0.387 | | | | |
| 8 | Lens 4 | −0.728 | (ASP) | 0.264 | Plastic | 1.640 | 23.3 | −8.10 |
| 9 | | −0.967 | (ASP) | 0.045 | | | | |
| 10 | Lens 5 | 1.414 | (ASP) | 1.082 | Plastic | 1.535 | 56.3 | 9.91 |
| 11 | | 1.415 | (ASP) | 0.700 | | | | |
| 12 | IR-cut filter | Plano | | 0.200 | Glass | 1.517 | 64.2 | — |

TABLE 9-continued

5th Embodiment
f = 3.60 mm, Fno = 2.18, HFOV = 37.7 deg.

| Surface # | | Curvature Radius | Thickness | Material | Index | Abbe # | Focal length |
|---|---|---|---|---|---|---|---|
| 13 | | Plano | 0.505 | | | | |
| 14 | Image | Plano | — | | | | |

Note:
Reference wavelength (d-line) is 587.6 nm.

TABLE 10

Aspheric Coefficients

| | Surface # | | | | |
|---|---|---|---|---|---|
| | 1 | 2 | 4 | 5 | 6 |
| k = | −9.5332E+00 | −1.4429E+01 | −1.0000E+00 | −2.6375E+01 | 3.0000E+00 |
| A4 = | −4.1405E−02 | −1.4386E−01 | −1.8972E−01 | −7.5168E−02 | −1.2675E−01 |
| A6 = | −1.8348E−02 | 6.0108E−02 | 2.1003E−01 | −1.6993E−01 | −3.3771E−03 |
| A8 = | −3.1663E−02 | −4.9175E−02 | −1.5384E−01 | 1.5263E−01 | 4.3135E−02 |
| A10 = | −6.2073E−02 | 2.6449E−02 | −2.3333E−02 | −2.9115E−01 | 6.1845E−03 |
| A12 = | 1.3623E−01 | −9.8098E−02 | 6.8831E−02 | 1.8506E−01 | −3.9735E−02 |
| A14 = | −8.6482E−02 | 8.1892E−02 | −3.4432E−02 | −4.1275E−02 | 3.8259E−02 |
| A16 = | — | — | — | — | −1.0683E−02 |

| | Surface # | | | | |
|---|---|---|---|---|---|
| | 7 | 8 | 9 | 10 | 11 |
| k = | −2.2262E+00 | −3.8211E+00 | −7.3332E−01 | −1.2866E+01 | −5.6116E+00 |
| A4 = | −6.7222E−02 | −5.8751E−02 | 1.6729E−01 | −1.2031E−01 | −5.9863E−02 |
| A6 = | −3.5190E−02 | −1.6804E−02 | −4.0552E−02 | 4.9340E−02 | 2.1984E−02 |
| A8 = | 4.3643E−02 | 1.2045E−01 | 2.1250E−02 | −4.2593E−02 | −8.7317E−03 |
| A10 = | 3.3982E−02 | −4.8357E−02 | 1.1734E−02 | 2.1526E−02 | 2.3043E−03 |
| A12 = | −1.8315E−02 | −7.7970E−03 | −2.0035E−03 | −5.6035E−03 | −3.7444E−04 |
| A14 = | −1.5956E−02 | 2.2879E−03 | −2.1788E−03 | 8.6236E−04 | 3.3248E−05 |
| A16 = | 9.2137E−03 | 2.0825E−04 | 6.5870E−04 | −6.2090E−05 | −1.2553E−06 |

In the imaging capturing lens assembly according to the 5th embodiment, the definitions of f, Fno, HFOV, V1, V2, V4, R1, R2, R3, R4, T34, T45, CT2, CT4, CT5, f4 and f5 are the same as those stated in the 1st embodiment with corresponding values for the 5th embodiment. Moreover, these parameters can be calculated from Table 9 and Table 10 as the following values and satisfy the following relationships:

| f (mm) | 3.60 | R2/R3 | 0.03 |
|---|---|---|---|
| Fno | 2.18 | R4/|R3| | 0.03 |
| HFOV (deg.) | 37.7 | T45/T34 | 0.12 |
| V2/V1 | 0.42 | (CT2 + CT4)/CT5 | 0.46 |
| (V2 + V4)/V1 | 0.83 | f/f4 | −0.45 |
| (R1 + R2)/(R1 − R2) | 0.16 | |f/f4| + |f/f5| | 0.81 |

6th Embodiment

Figure 11:
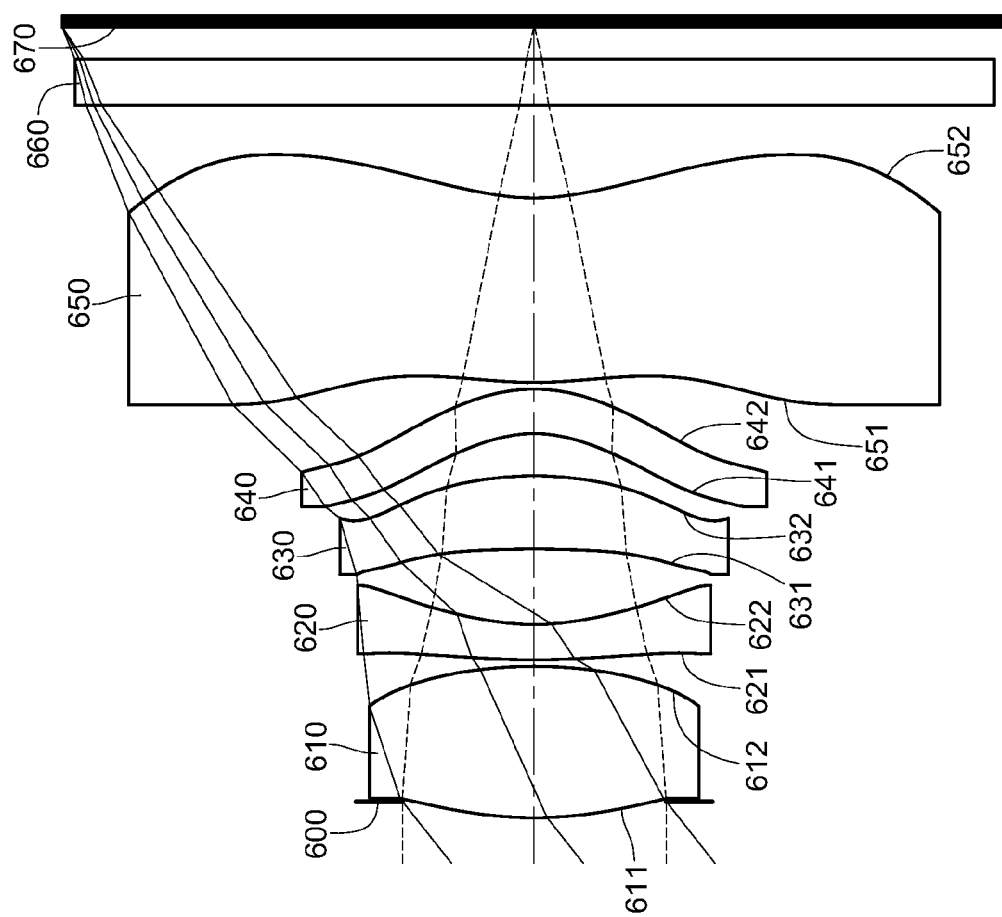
FIG. 11 is a schematic view of an imaging capturing lens assembly according to the 6th embodiment of the present disclosure.
Figure 12:
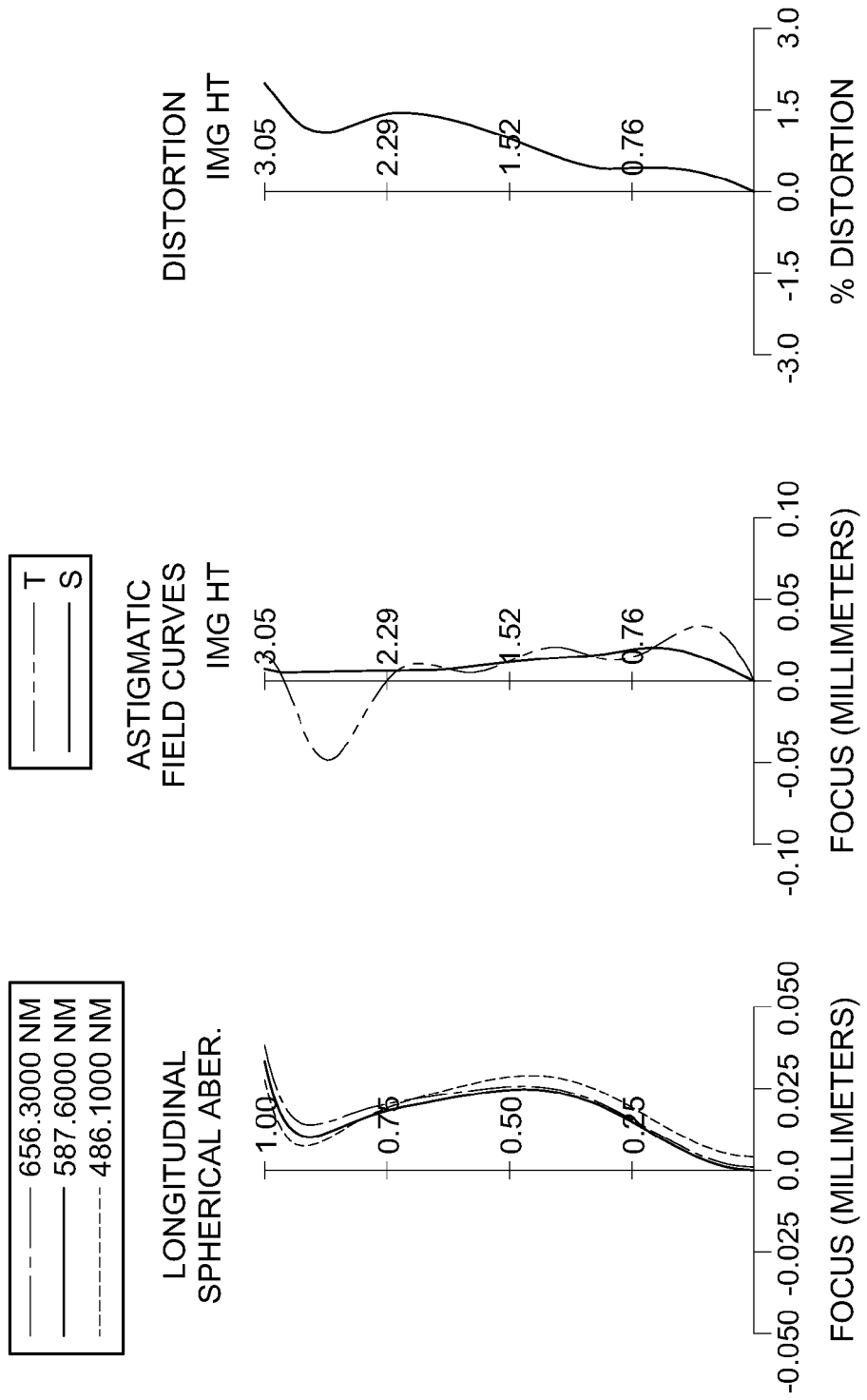
FIG. 12 shows spherical aberration curves, astigmatic field curves and a distortion curve of the imaging capturing lens assembly according to the 6th embodiment.

FIG. 11 is a schematic view of an imaging capturing lens assembly according to the 6th embodiment of the present disclosure. FIG. 12 shows spherical aberration curves, astigmatic field curves and a distortion curve of the imaging capturing lens assembly according to the 6th embodiment. In FIG. 11, the imaging capturing lens assembly includes, in order from an object side to an image side, an aperture stop 600, the first lens element 610, the second lens element 620, the third lens element 630, the fourth lens element 640, the fifth lens element 650, an IR-cut filter 660 and an image plane 670.

The first lens element 610 with positive refractive power has a convex object-side surface 611 and a convex image-side surface 612, and is made of plastic material. The object-side surface 611 and the image-side surface 612 of the first lens element 610 are aspheric.

The second lens element 620 with negative refractive power has a convex object-side surface 621 and a concave image-side surface 622, and is made of plastic material. The object-side surface 621 and the image-side surface 622 of the second lens element 620 are aspheric. Furthermore, the object-side surface 621 and the image-side surface 622 of the second lens element 620 both have at least one inflection point.

The third lens element 630 with positive refractive power has a concave object-side surface 631 and a convex image-side surface 632, and is made of plastic material. The object-side surface 631 and the image-side surface 632 of the third lens element 630 are aspheric.

The fourth lens element 640 with negative refractive power has a concave object-side surface 641 and a convex image-side surface 642, and is made of plastic material. The object-side surface 641 and the image-side surface 642 of the fourth lens element 640 are aspheric.

The fifth lens element 650 with negative refractive power has a convex object-side surface 651 and a concave image-side surface 652, and is made of plastic material. The object-side surface 651 and the image-side surface 652 of the fifth lens element 650 are aspheric. Furthermore, the object-side surface 651 and the image-side surface 652 of the fifth lens element 650 both have at least one inflection point.

The IR-cut filter 660 is made of glass and located between the fifth lens element 650 and the image plane 670, and will not affect the focal length of the imaging capturing lens assembly.

The detailed optical data of the 6th embodiment are shown in Table 11 and the aspheric surface data are shown in Table 12 below.

eters can be calculated from Table 11 and Table 12 as the following values and satisfy the following relationships:

| f (mm) | 3.75 | R2/R3 | −0.74 |
|---|---|---|---|
| Fno | 2.20 | R4/|R3| | 0.40 |
| HFOV (deg.) | 38.5 | T45/T34 | 0.15 |
| V2/V1 | 0.40 | (CT2 + CT4)/CT5 | 0.43 |
| (V2 + V4)/V1 | 0.80 | f/f4 | −0.26 |
| (R1 + R2)/(R1 − R2) | −0.08 | |f/f4| + |f/f5| | 0.55 |

TABLE 11

6th Embodiment
f = 3.75 mm, Fno = 2.20, HFOV = 38.5 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.105 | | | | |
| 2 | Lens 1 | 2.574 | (ASP) | 0.980 | Plastic | 1.565 | 58.0 | 2.63 |
| 3 | | −3.022 | (ASP) | 0.042 | | | | |
| 4 | Lens 2 | 4.074 | (ASP) | 0.230 | Plastic | 1.640 | 23.3 | −4.43 |
| 5 | | 1.635 | (ASP) | 0.488 | | | | |
| 6 | Lens 3 | −8.797 | (ASP) | 0.474 | Plastic | 1.544 | 55.9 | 5.83 |
| 7 | | −2.376 | (ASP) | 0.275 | | | | |
| 8 | Lens 4 | −0.831 | (ASP) | 0.288 | Plastic | 1.640 | 23.3 | −14.23 |
| 9 | | −1.038 | (ASP) | 0.041 | | | | |
| 10 | Lens 5 | 2.426 | (ASP) | 1.196 | Plastic | 1.544 | 55.9 | −13.32 |
| 11 | | 1.502 | (ASP) | 0.600 | | | | |
| 12 | IR-cut filter | Plano | | 0.300 | Glass | 1.517 | 64.2 | — |
| 13 | | Plano | | 0.205 | | | | |
| 14 | Image | Plano | | — | | | | |

Note:
Reference wavelength (d-line) is 587.6 nm.

TABLE 12

Aspheric Coefficients

| | Surface # | | | | |
|---|---|---|---|---|---|
| | 2 | 3 | 4 | 5 | 6 |
| k = | −6.8741E−01 | −1.2927E+01 | −5.8663E+01 | −7.5406E+00 | −2.3711E+01 |
| A4 = | −2.1093E−02 | −9.3989E−02 | −9.5962E−02 | −1.2656E−02 | −7.1568E−02 |
| A6 = | −8.6546E−03 | 8.6393E−02 | 1.2302E−01 | 1.5729E−03 | −4.1632E−02 |
| A8 = | −2.3588E−02 | −8.2388E−02 | 4.7500E−03 | 1.6174E−01 | 4.6122E−03 |
| A10 = | −1.6377E−02 | −1.0504E−02 | −1.2047E−01 | −2.5646E−01 | 1.1784E−02 |
| A12 = | 6.9756E−02 | 2.6580E−02 | 4.9930E−02 | 1.6011E−01 | 1.4734E−02 |
| A14 = | −6.0040E−02 | −7.2912E−03 | 4.0711E−03 | −4.3749E−02 | 6.0069E−02 |
| A16 = | — | — | — | — | −4.7295E−02 |

| | Surface # | | | | |
|---|---|---|---|---|---|
| | 7 | 8 | 9 | 10 | 11 |
| k = | 2.0783E+00 | −3.7948E+00 | −7.8991E−01 | −3.9736E+01 | −7.3465E+00 |
| A4 = | −2.1091E−02 | −5.5449E−02 | 1.5423E−01 | −1.2747E−01 | −4.5932E−02 |
| A6 = | −2.8590E−02 | −1.5747E−02 | −4.1442E−02 | 6.7716E−02 | 1.9403E−02 |
| A8 = | 2.3489E−02 | 1.1964E−01 | 2.0000E−02 | −4.1144E−02 | −8.0358E−03 |
| A10 = | 3.1570E−02 | −4.7588E−02 | 9.3439E−03 | 2.0980E−02 | 2.2378E−03 |
| A12 = | −3.0253E−03 | −7.3243E−03 | −3.2197E−03 | −5.8996E−03 | −3.9023E−04 |
| A14 = | −7.5129E−05 | 2.7450E−03 | −2.5865E−03 | 8.2331E−04 | 3.6985E−05 |
| A16 = | −8.1514E−04 | 7.5837E−04 | 7.8274E−04 | −4.5463E−05 | −1.4264E−06 |

Figure 13:
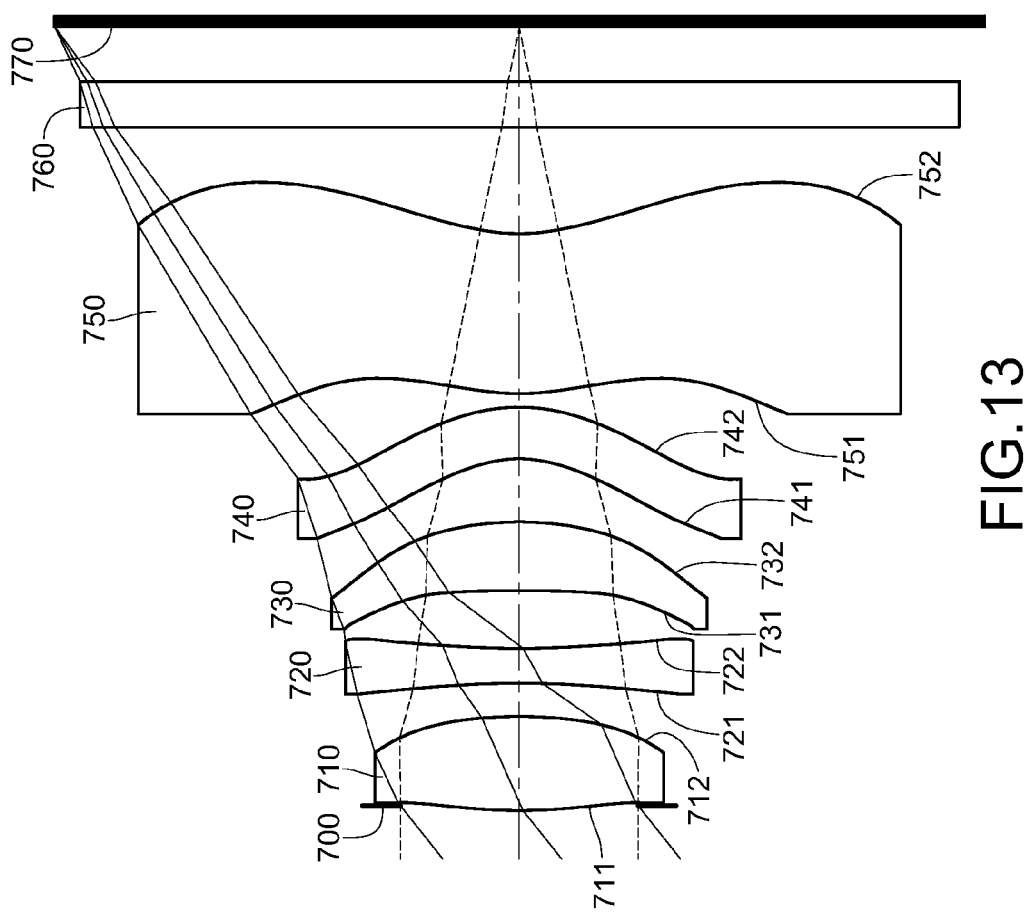
FIG. 13 is a schematic view of an imaging capturing lens assembly according to the 7th embodiment of the present disclosure.
Figure 14:
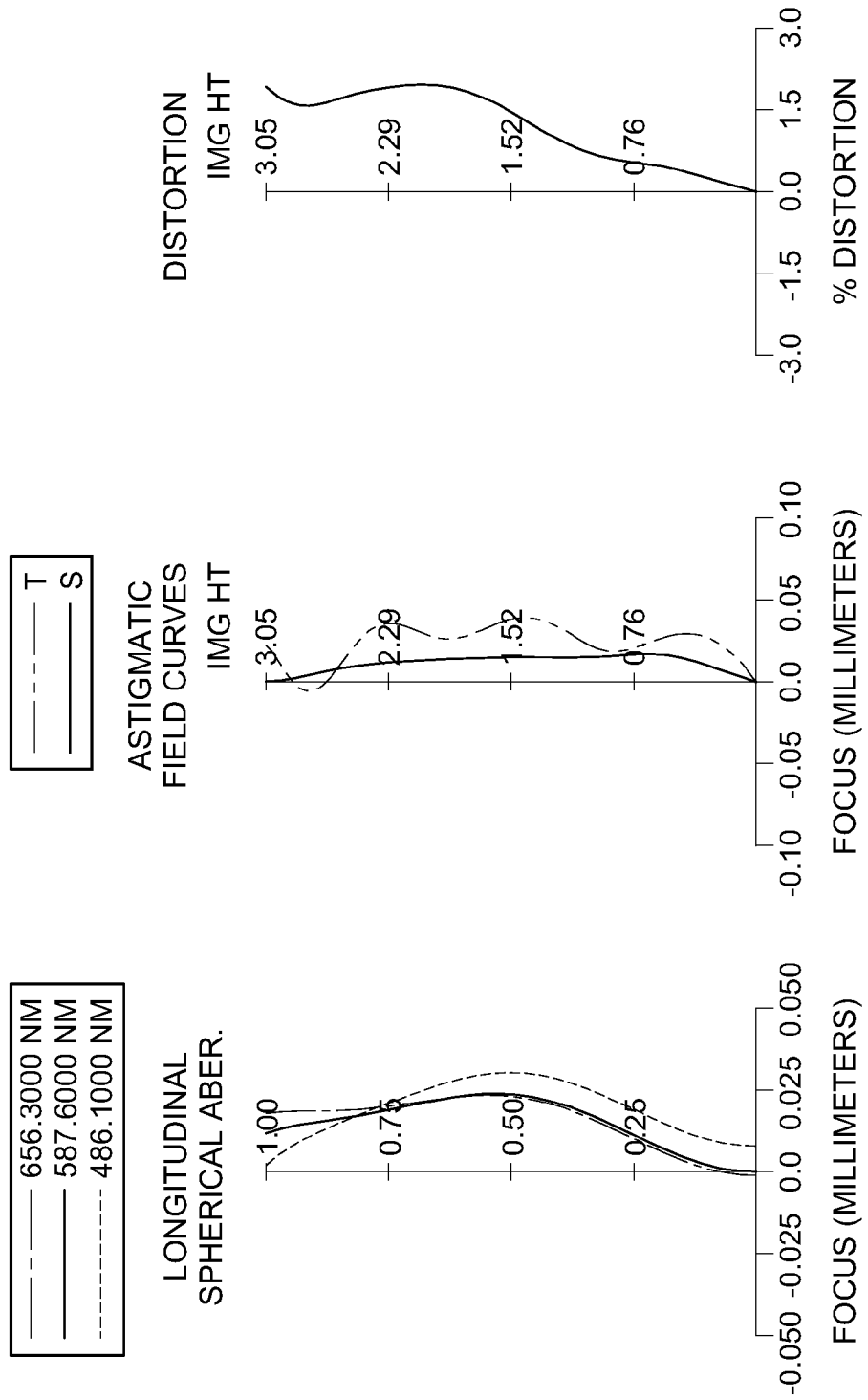
FIG. 14 shows spherical aberration curves, astigmatic field curves and a distortion curve of the imaging capturing lens assembly according to the 7th embodiment.

In the imaging capturing lens assembly according to the 6th embodiment, the definitions of f, Fno, HFOV, V1, V2, V4, R1, R2, R3, R4, T34, T45, CT2, CT4, CT5, f4 and f5 are the same as those stated in the 1st embodiment with corresponding values for the 6th embodiment. Moreover, these param- 7th Embodiment FIG. 13 is a schematic view of an imaging capturing lens assembly according to the 7th embodiment of the present disclosure. FIG. 14 shows spherical aberration curves, astigmatic field curves and a distortion curve of the imaging capturing lens assembly according to the 7th embodiment. In FIG. 13, the imaging capturing lens assembly includes, in order from an object side to an image side, an aperture stop 700, the first lens element 710, the second lens element 720, the third lens element 730, the fourth lens element 740, the fifth lens element 750, an IR-cut filter 760 and an image plane 770.

The first lens element 710 with positive refractive power has a convex object-side surface 711 and a convex image-side surface 712, and is made of plastic material. The object-side surface 711 and the image-side surface 712 of the first lens element 710 are aspheric.

The second lens element 720 with negative refractive power has a concave object-side surface 721 and a concave image-side surface 722, and is made of plastic material. The object-side surface 721 and the image-side surface 722 of the second lens element 720 are aspheric. Furthermore, the object-side surface 721 and the image-side surface 722 of the second lens element 720 both have at least one inflection point.

The third lens element 730 with positive refractive power has a concave object-side surface 731 and a convex image-side surface 732, and is made of plastic material. The object-side surface 731 and the image-side surface 732 of the third lens element 730 are aspheric.

The fourth lens element 740 with negative refractive power has a concave object-side surface 741 and a convex image-side surface 742, and is made of plastic material. The object-side surface 741 and the image-side surface 742 of the fourth lens element 740 are aspheric.

The fifth lens element 750 with positive refractive power has a convex object-side surface 751 and a concave image-side surface 752, and is made of plastic material. The object-side surface 751 and the image-side surface 752 of the fifth lens element 750 are aspheric. Furthermore, the object-side surface 751 and the image-side surface 752 of the fifth lens element 750 both have at least one inflection point.

The IR-cut filter 760 is made of glass and located between the fifth lens element 750 and the image plane 770, and will not affect the focal length of the imaging capturing lens assembly.

The detailed optical data of the 7th embodiment are shown in Table 13 and the aspheric surface data are shown in Table 14 below.

TABLE 13

7th Embodiment
f = 3.75 mm, Fno = 2.40, HFOV = 38.5 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.031 | | | | |
| 2 | Lens 1 | 3.424 | (ASP) | 0.619 | Plastic | 1.544 | 55.9 | 3.03 |
| 3 | | −2.976 | (ASP) | 0.217 | | | | |
| 4 | Lens 2 | −8.277 | (ASP) | 0.230 | Plastic | 1.640 | 23.3 | −5.08 |
| 5 | | 5.404 | (ASP) | 0.379 | | | | |
| 6 | Lens 3 | −18.731 | (ASP) | 0.452 | Plastic | 1.544 | 55.9 | 4.59 |
| 7 | | −2.224 | (ASP) | 0.415 | | | | |
| 8 | Lens 4 | −0.801 | (ASP) | 0.340 | Plastic | 1.640 | 23.3 | −6.59 |
| 9 | | −1.152 | (ASP) | 0.089 | | | | |
| 10 | Lens 5 | 1.569 | (ASP) | 1.051 | Plastic | 1.544 | 55.9 | 31.73 |
| 11 | | 1.319 | (ASP) | 0.700 | | | | |
| 12 | IR-cut filter | Plano | | 0.300 | Glass | 1.517 | 64.2 | — |
| 13 | | Plano | | 0.359 | | | | |
| 14 | Image | Plano | | — | | | | |

Note:
Reference wavelength (d-line) is 587.6 nm.

TABLE 14

Aspheric Coefficients

| | Surface # | | | | |
|---|---|---|---|---|---|
| | 2 | 3 | 4 | 5 | 6 |
| k = | −6.1913E+00 | −1.9370E+01 | 2.8254E+00 | −6.3507E+01 | 3.0000E+00 |
| A4 = | −4.2494E−02 | −1.6430E−01 | −7.8104E−02 | −3.1518E−02 | −1.1426E−01 |
| A6 = | −5.5489E−02 | 5.7590E−02 | 1.2100E−01 | −1.0831E−02 | −6.7617E−02 |
| A8 = | 2.7583E−03 | −2.9122E−02 | 1.8554E−02 | 1.7188E−01 | −4.3360E−03 |
| A10 = | −6.8260E−02 | −5.0334E−02 | −1.1059E−01 | −2.4352E−01 | 1.5973E−02 |
| A12 = | 6.9128E−02 | 2.7865E−02 | 4.1729E−02 | 1.5472E−01 | 1.9763E−02 |
| A14 = | −6.0040E−02 | −7.1280E−03 | 4.1112E−03 | −4.5978E−02 | 5.9987E−02 |
| A16 = | — | — | — | — | −4.7271E−02 |

| | Surface # | | | | |
|---|---|---|---|---|---|
| | 7 | 8 | 9 | 10 | 11 |
| k = | 1.3861E+00 | −3.8793E+00 | −6.9387E−01 | −1.2201E+01 | −5.2857E+00 |
| A4 = | −4.3169E−02 | −6.0973E−02 | 1.2809E−01 | −1.2309E−01 | −5.2254E−02 |

TABLE 14-continued

Aspheric Coefficients

| | | | | | |
|---|---|---|---|---|---|
| A6 = | −4.8594E−02 | −2.3102E−02 | −4.2408E−02 | 5.5953E−02 | 2.0984E−02 |
| A8 = | 1.1998E−02 | 1.1995E−01 | 2.1906E−02 | −4.0877E−02 | −8.5601E−03 |
| A10 = | 2.5989E−02 | −4.7757E−02 | 9.8890E−03 | 2.1290E−02 | 2.3446E−03 |
| A12 = | −3.3120E−03 | −7.1984E−03 | −3.0537E−03 | −5.8536E−03 | −3.9493E−04 |
| A14 = | 6.8122E−04 | 2.8829E−03 | −2.5274E−03 | 8.2481E−04 | 3.6309E−05 |
| A16 = | −9.4250E−04 | 6.6064E−04 | 8.0224E−04 | −4.8729E−05 | −1.3944E−06 |

In the imaging capturing lens assembly according to the 7th embodiment, the definitions of f, Fno, HFOV, V1, V2, V4, R1, R2, R3, R4, T34, T45, CT2, CT4, CT5, f4 and f5 are the same as those stated in the 1st embodiment with corresponding values for the 7th embodiment. Moreover, these parameters can be calculated from Table 13 and Table 14 as the following values and satisfy the following relationships:

| | | | |
|---|---|---|---|
| f (mm) | 3.75 | R2/R3 | 0.36 |
| Fno | 2.40 | R4/|R3| | 0.65 |
| HFOV (deg.) | 38.5 | T45/T34 | 0.21 |
| V2/V1 | 0.42 | (CT2 + CT4)/CT5 | 0.54 |
| (V2 + V4)/V1 | 0.83 | f/f4 | −0.57 |
| (R1 + R2)/(R1 − R2) | 0.07 | |f/f4| + |f/f5| | 0.69 |

8th Embodiment

Figure 15:
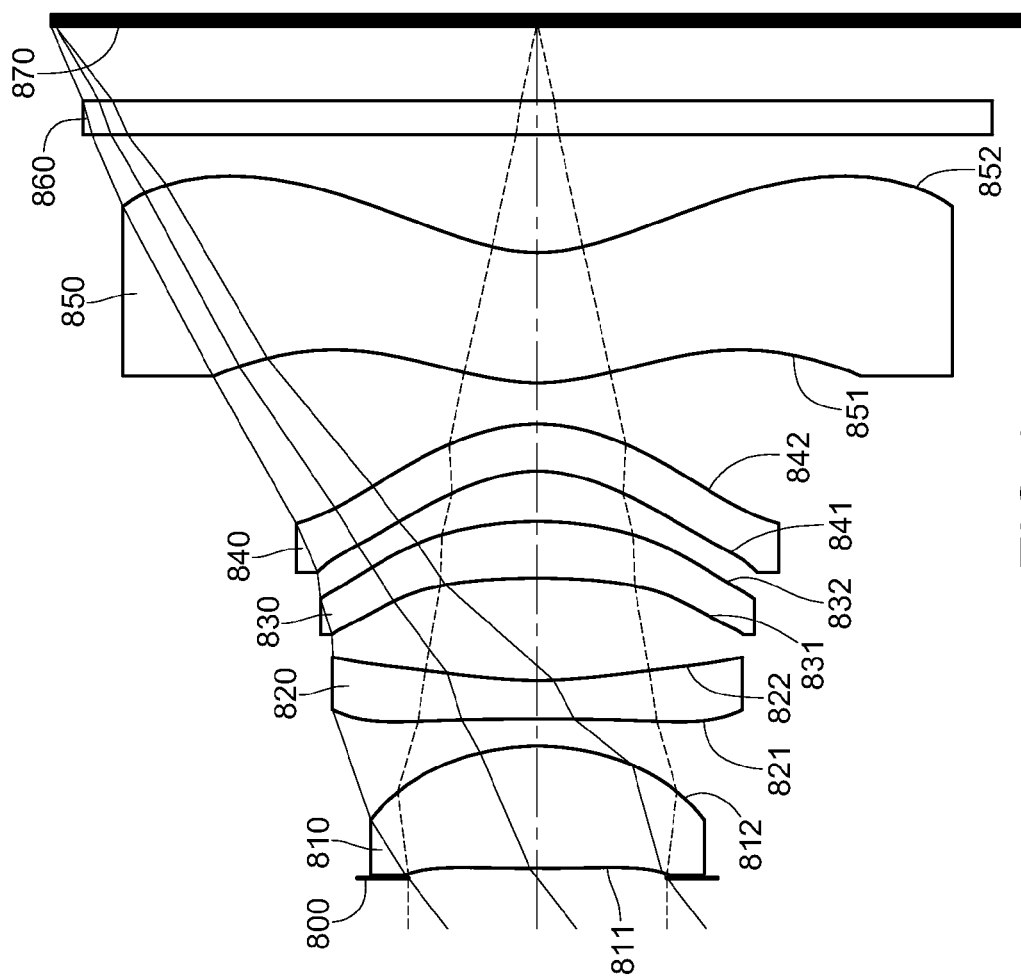
FIG. 15 is a schematic view of an imaging capturing lens assembly according to the 8th embodiment of the present disclosure.
Figure 16:
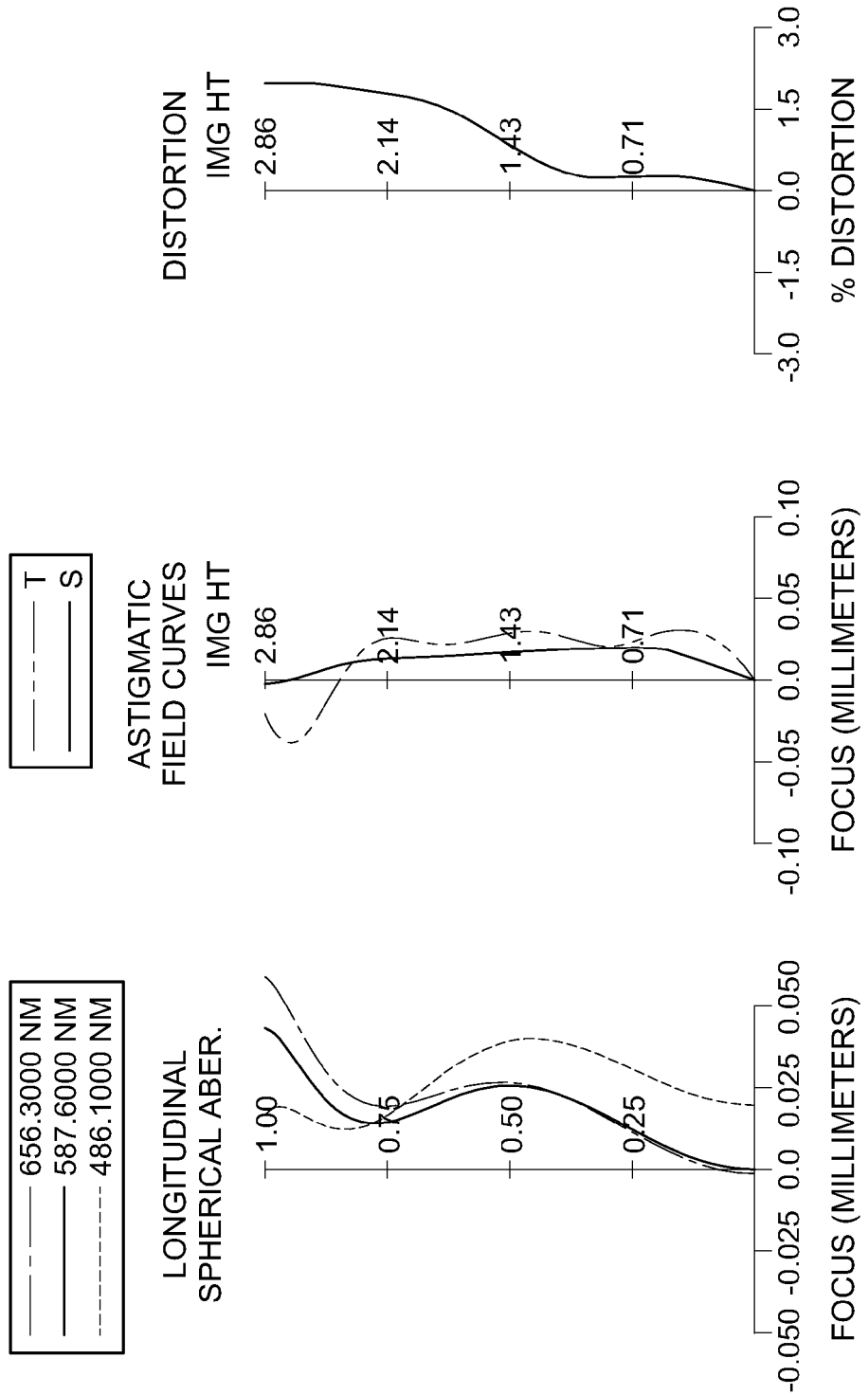
FIG. 16 shows spherical aberration curves, astigmatic field curves and a distortion curve of the imaging capturing lens assembly according to the 8th embodiment.

FIG. 15 is a schematic view of an imaging capturing lens assembly according to the 8th embodiment of the present disclosure. FIG. 16 shows spherical aberration curves, astigmatic field curves and a distortion curve of the imaging capturing lens assembly according to the 8th embodiment. In FIG. 15, the imaging capturing lens assembly includes, in order from an object side to an image side, an aperture stop 800, the first lens element 810, the second lens element 820, the third lens element 830, the fourth lens element 840, the fifth lens element 850, an IR-cut filter 860 and an image plane 870.

The first lens element 810 with positive refractive power has a convex object-side surface 811 and a convex image-side surface 812, and is made of plastic material. The object-side surface 811 and the image-side surface 812 of the first lens element 810 are aspheric.

The second lens element 820 with negative refractive power has a concave object-side surface 821 and a concave image-side surface 822, and is made of plastic material. The object-side surface 821 and the image-side surface 822 of the second lens element 820 are aspheric. Furthermore, the object-side surface 821 and the image-side surface 822 of the second lens element 820 both have at least one inflection point.

The third lens element 830 with positive refractive power has a concave object-side surface 831 and a convex image-side surface 832, and is made of plastic material. The object-side surface 831 and the image-side surface 832 of the third lens element 830 are aspheric.

The fourth lens element 840 with negative refractive power has a concave object-side surface 841 and a convex image-side surface 842, and is made of plastic material. The object-side surface 841 and the image-side surface 842 of the fourth lens element 840 are aspheric.

The fifth lens element 850 with positive refractive power has a convex object-side surface 851 and a concave image-side surface 852, and is made of plastic material. The object-side surface 851 and the image-side surface 852 of the fifth lens element 850 are aspheric. Furthermore, the object-side surface 851 and the image-side surface 852 of the fifth lens element 850 both have at least one inflection point.

The IR-cut filter 860 is made of glass and located between the fifth lens element 850 and the image plane 870, and will not affect the focal length of the imaging capturing lens assembly.

The detailed optical data of the 8th embodiment are shown in Table 15 and the aspheric surface data are shown in Table 16 below.

TABLE 15

8th Embodiment
f = 3.60 mm, Fno = 2.35, HFOV = 37.7 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | 0.059 | | | | |
| 2 | Lens 1 | 9.275 | (ASP) | 0.725 | Plastic | 1.544 | 55.9 | 2.40 |
| 3 | | −1.475 | (ASP) | 0.161 | | | | |
| 4 | Lens 2 | −88.246 | (ASP) | 0.230 | Plastic | 1.650 | 21.4 | −4.07 |
| 5 | | 2.726 | (ASP) | 0.606 | | | | |
| 6 | Lens 3 | −4.805 | (ASP) | 0.336 | Plastic | 1.544 | 55.9 | 7.18 |
| 7 | | −2.207 | (ASP) | 0.299 | | | | |
| 8 | Lens 4 | −0.842 | (ASP) | 0.280 | Plastic | 1.650 | 21.4 | −11.47 |
| 9 | | −1.074 | (ASP) | 0.244 | | | | |
| 10 | Lens 5 | 1.257 | (ASP) | 0.774 | Plastic | 1.535 | 56.3 | 106.65 |
| 11 | | 1.010 | (ASP) | 0.700 | | | | |
| 12 | IR-cut filter | Plano | | 0.200 | Glass | 1.517 | 64.2 | — |
| 13 | | Plano | | 0.442 | | | | |
| 14 | Image | Plano | | — | | | | |

Note:
Reference wavelength (d-line) is 587.6 nm.

TABLE 16

Aspheric Coefficients

| | | | Surface # | | |
|---|---|---|---|---|---|
| | 2 | 3 | 4 | 5 | 6 |
| k = | −1.2168E+02 | −5.5603E+00 | −7.0000E+01 | −2.1614E+01 | 2.5456E+00 |
| A4 = | −9.5857E−02 | −2.0240E−01 | −9.1497E−02 | −3.4937E−02 | −8.4214E−02 |
| A6 = | −9.8958E−02 | 5.3936E−02 | 1.0485E−01 | −3.6002E−02 | −3.1043E−02 |
| A8 = | 3.3906E−02 | −2.8488E−02 | 1.8562E−02 | 1.5100E−01 | −2.3150E−02 |
| A10 = | −1.8083E−01 | −4.9159E−02 | −8.6325E−02 | −2.3386E−01 | −9.2492E−03 |
| A12 = | 1.4480E−01 | 3.1936E−02 | 7.1649E−02 | 1.7714E−01 | 1.1786E−02 |
| A14 = | −1.3863E−01 | −1.6681E−02 | −1.9530E−02 | −4.9026E−02 | 6.4189E−02 |
| A16 = | — | — | — | — | −3.6022E−02 |

| | | | Surface # | | |
|---|---|---|---|---|---|
| | 7 | 8 | 9 | 10 | 11 |
| k = | 9.9587E−01 | −3.7273E+00 | −6.7294E−01 | −6.9501E+00 | −4.4237E+00 |
| A4 = | −2.1545E−02 | −7.0893E−02 | 1.3927E−01 | −9.7446E−02 | −4.8431E−02 |
| A6 = | −4.5346E−02 | −3.1656E−02 | −4.4925E−02 | 5.8478E−02 | 1.9535E−02 |
| A8 = | 1.6013E−02 | 1.1936E−01 | 1.8851E−02 | −4.4276E−02 | −8.3297E−03 |
| A10 = | 2.9007E−02 | −4.5932E−02 | 9.8061E−02 | 2.1311E−02 | 2.2992E−03 |
| A12 = | −4.0996E−03 | −5.8174E−03 | −2.4598E−03 | −5.7668E−03 | −3.7937E−04 |
| A14 = | −1.0540E−03 | 2.5209E−03 | −2.3296E−03 | 8.3599E−04 | 3.4229E−05 |
| A16 = | −1.3650E−03 | −1.2539E−04 | 6.9976E−04 | −5.1704E−05 | −1.3239E−06 |

In the imaging capturing lens assembly according to the 8th embodiment, the definitions of f, Fno, HFOV, V1, V2, V4, R1, R2, R3, R4, T34, T45, CT2, CT4, CT5, f4 and f5 are the same as those stated in the 1st embodiment with corresponding values for the 8th embodiment. Moreover, these parameters can be calculated from Table 15 and Table 16 as the following values and satisfy the following relationships:

| | | | |
|---|---|---|---|
| f (mm) | 3.60 | R2/R3 | 0.02 |
| Fno | 2.35 | R4/|R3| | 0.03 |
| HFOV (deg.) | 37.7 | T45/T34 | 0.82 |
| V2/V1 | 0.38 | (CT2 + CT4)/CT5 | 0.66 |
| (V2 + V4)/V1 | 0.77 | f/f4 | −0.31 |
| (R1 + R2)/(R1 − R2) | 0.73 | |f/f4| + |f/f5| | 0.35 |

9th Embodiment

Figure 17:
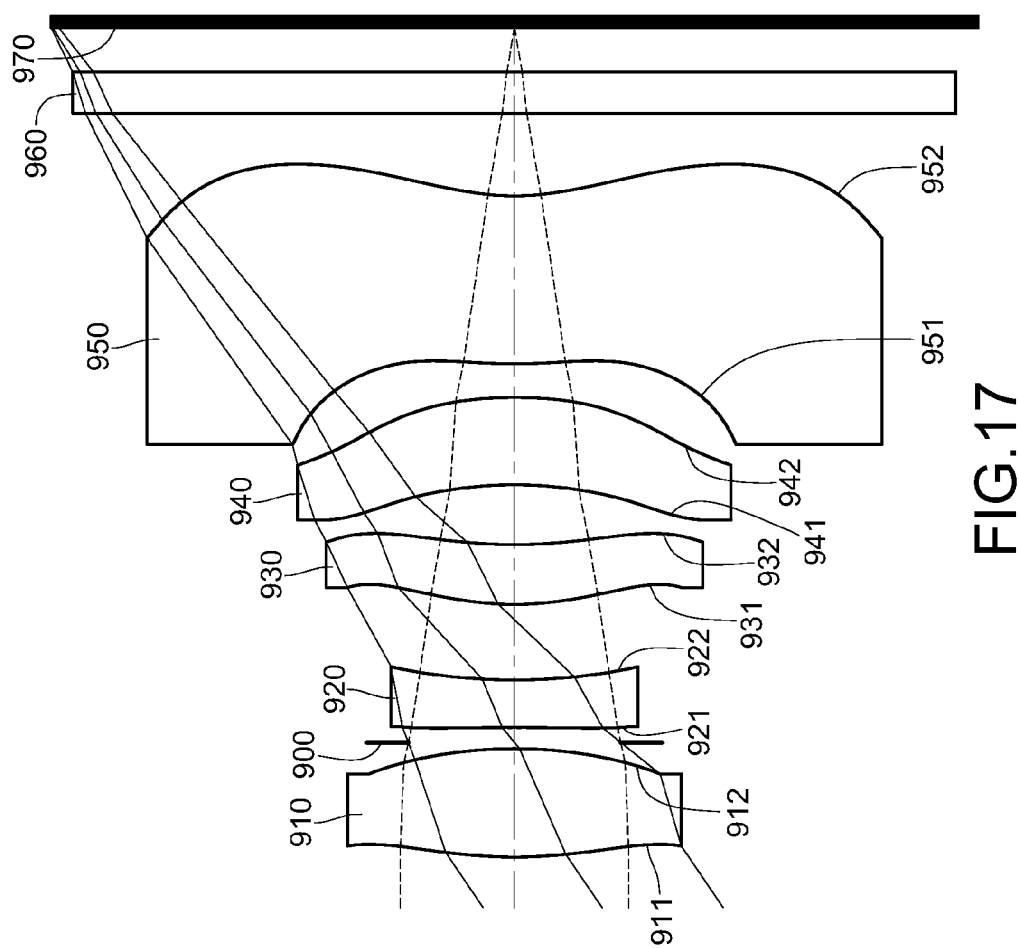
FIG. 17 is a schematic view of an imaging capturing lens assembly according to the 9th embodiment of the present disclosure.
Figure 18:
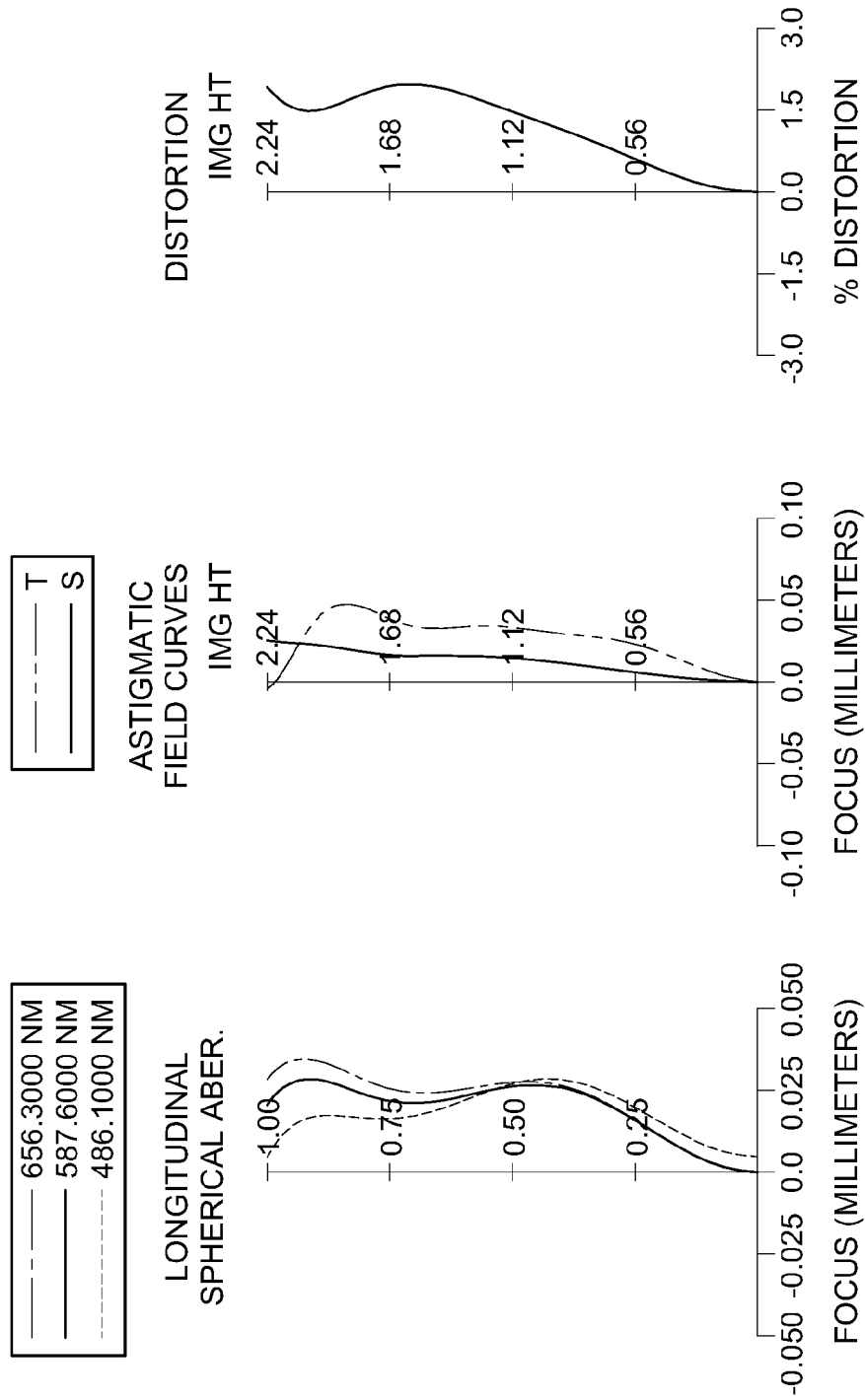
FIG. 18 shows spherical aberration curves, astigmatic field curves and a distortion curve of the imaging capturing lens assembly according to the 9th embodiment.

FIG. 17 is a schematic view of an imaging capturing lens assembly according to the 9th embodiment of the present disclosure. FIG. 18 shows spherical aberration curves, astigmatic field curves and a distortion curve of the imaging capturing lens assembly according to the 9th embodiment. In FIG. 17, the imaging capturing lens assembly includes, in order from an object side to an image side, the first lens element 910, an aperture stop 900, the second lens element 920, the third lens element 930, the fourth lens element 940, the fifth lens element 950, an IR-cut filter 960 and an image plane 970.

The first lens element 910 with positive refractive power has a convex object-side surface 911 and a convex image-side surface 912, and is made of plastic material. The object-side surface 911 and the image-side surface 912 of the first lens element 910 are aspheric.

The second lens element 920 with negative refractive power has a concave object-side surface 921 and a concave image-side surface 922, and is made of plastic material. The object-side surface 921 and the image-side surface 922 of the second lens element 920 are aspheric. Furthermore, the object-side surface 921 of the second lens element 920 has at least one inflection point.

The third lens element 930 with positive refractive power has a convex object-side surface 931 and a concave image-side surface 932, and is made of plastic material. The object-side surface 931 and the image-side surface 932 of the third lens element 930 are aspheric.

The fourth lens element 940 with negative refractive power has a concave object-side surface 941 and a convex image-side surface 942, and is made of plastic material. The object-side surface 941 and the image-side surface 942 of the fourth lens element 940 are aspheric.

The fifth lens element 950 with negative refractive power has a convex object-side surface 951 and a concave image-side surface 952, and is made of plastic material. The object-side surface 951 and the image-side surface 952 of the fifth lens element 950 are aspheric. Furthermore, the object-side surface 951 and the image-side surface 952 of the fifth lens element 950 both have at least one inflection point.

The IR-cut filter 960 is made of glass and located between the fifth lens element 950 and the image plane 970, and will not affect the focal length of the imaging capturing lens assembly.

The detailed optical data of the 9th embodiment are shown in Table 17 and the aspheric surface data are shown in Table 18 below.

TABLE 17

9th Embodiment
f = 3.21 mm, Fno = 2.90, HFOV = 34.3 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 2.308 | (ASP) | 0.526 | Plastic | 1.544 | 55.9 | 2.15 |
| 2 | | −2.174 | (ASP) | 0.030 | | | | |
| 3 | Ape. Stop | Plano | | 0.073 | | | | |
| 4 | Lens 2 | −10.052 | (ASP) | 0.230 | Plastic | 1.640 | 23.3 | −3.29 |
| 5 | | 2.688 | (ASP) | 0.367 | | | | |
| 6 | Lens 3 | 1.476 | (ASP) | 0.290 | Plastic | 1.544 | 55.9 | 6.55 |
| 7 | | 2.345 | (ASP) | 0.291 | | | | |
| 8 | Lens 4 | −1.961 | (ASP) | 0.424 | Plastic | 1.544 | 55.9 | −91.45 |
| 9 | | −2.197 | (ASP) | 0.163 | | | | |
| 10 | Lens 5 | 2.440 | (ASP) | 0.816 | Plastic | 1.535 | 56.3 | −6.66 |
| 11 | | 1.279 | (ASP) | 0.400 | | | | |
| 12 | IR-cut filter | Plano | | 0.200 | Glass | 1.517 | 64.2 | — |
| 13 | | Plano | | 0.217 | | | | |
| 14 | Image | Plano | | — | | | | |

Note:
Reference wavelength (d-line) is 587.6 nm.

TABLE 18

Aspheric Coefficients

| Surface # | | | | | |
|---|---|---|---|---|---|
| | 1 | 2 | 4 | 5 | 6 |
| k = | −8.6243E+00 | −1.1886E+01 | −8.6510E+01 | −1.0789E+01 | −2.6676E+00 |
| A4 = | −7.5639E−02 | −1.3440E−01 | 6.5045E−02 | −1.2309E−01 | −2.2088E−01 |
| A6 = | 1.7537E−01 | 8.7712E−02 | 7.2244E−01 | 8.7082E−01 | 3.2256E−01 |
| A8 = | −1.5946E+00 | 1.7245E−01 | −1.5540E+00 | −1.7245E+00 | −1.6990E+00 |
| A10 = | 3.6539E+00 | −1.3908E+00 | 1.3403E+00 | 9.4994E−01 | 4.5610E+00 |
| A12 = | −3.9953E+00 | 2.1810E+00 | 7.2879E−01 | 1.7509E+00 | −7.1822E+00 |
| A14 = | 1.6567E+00 | −1.1136E+00 | −7.6651E−01 | −1.2268E+00 | 4.1920E+00 |

| Surface # | | | | | |
|---|---|---|---|---|---|
| | 7 | 8 | 9 | 10 | 11 |
| k = | 1.0000E+00 | −8.4436E+00 | 1.7005E−01 | −3.1566E+01 | −4.2876E+00 |
| A4 = | −1.2312E−01 | −2.0883E−02 | −4.2336E−01 | −5.7603E−01 | −2.3991E−01 |
| A6 = | −4.4933E−01 | −4.8785E−01 | 6.5106E−01 | 2.5913E−01 | 1.7397E−01 |
| A8 = | 1.0195E+00 | 5.1298E−01 | −9.5543E−01 | 7.61184E−02 | −9.3625E−02 |
| A10 = | −1.6176E+00 | 9.6554E−01 | 1.3735E+00 | −1.3303E−01 | 3.1727E−02 |
| A12 = | 1.1548E+00 | −1.4670E+00 | −9.1560E−01 | 1.7012E−02 | −6.5171E−03 |
| A14 = | −2.2875E−01 | 5.1529E−01 | 2.0271E−01 | −1.9352E−02 | 5.9345E−04 |

In the imaging capturing lens assembly according to the 9th embodiment, the definitions of f, Fno, HFOV, V1, V2, V4, R1, R2, R3, R4, T34, T45, CT2, CT4, CT5, f4 and f5 are the same as those stated in the 1st embodiment with corresponding values for the 9th embodiment. Moreover, these parameters can be calculated from Table 17 and Table 18 as the following values and satisfy the following relationships:

| | | | |
|---|---|---|---|
| f (mm) | 3.21 | R2/R3 | 0.22 |
| Fno | 2.90 | R4/|R3| | 0.27 |
| HFOV (deg.) | 34.3 | T45/T34 | 0.56 |
| V2/V1 | 0.42 | (CT2 + CT4)/CT5 | 0.80 |
| (V2 + V4)/V1 | 1.42 | f/f4 | −0.04 |
| (R1 + R2)/(R1 − R2) | 0.03 | |f/f4| + |f/f5| | 0.52 |

10th Embodiment

Figure 19:
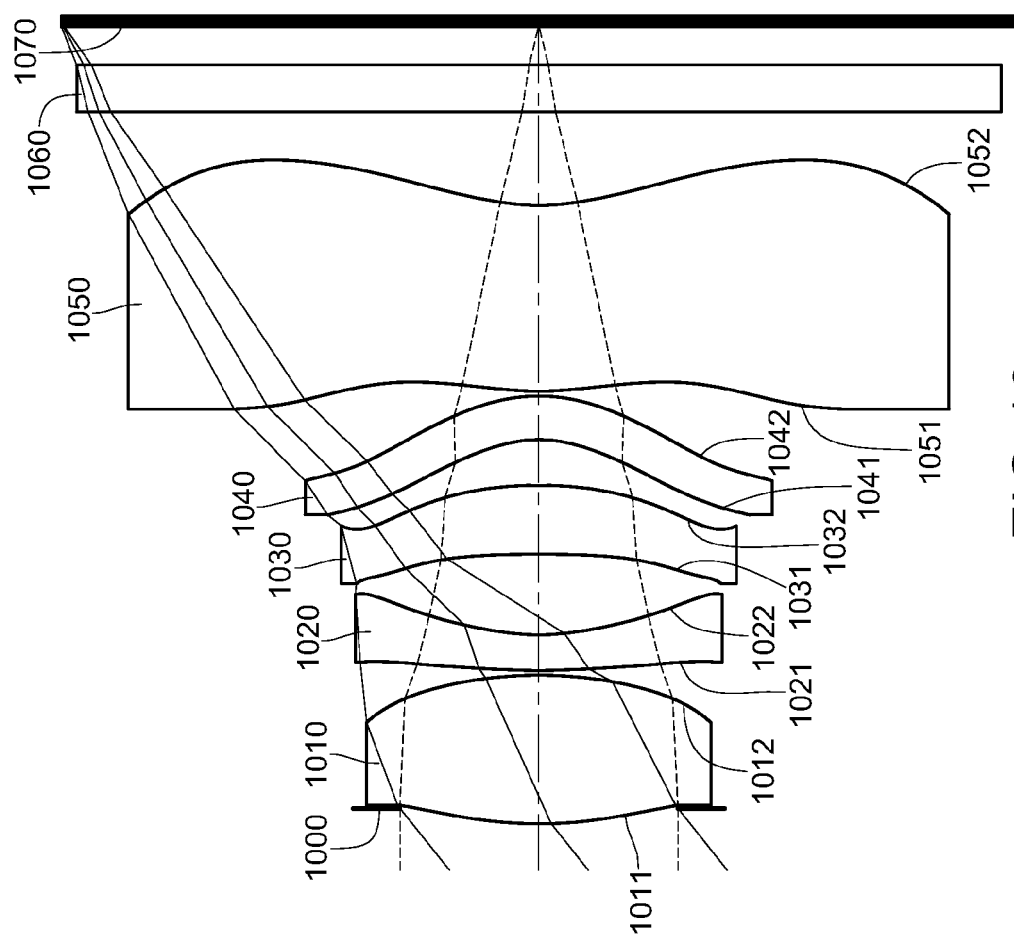
FIG. 19 is a schematic view of an imaging capturing lens assembly according to the 10th embodiment of the present disclosure.
Figure 20:
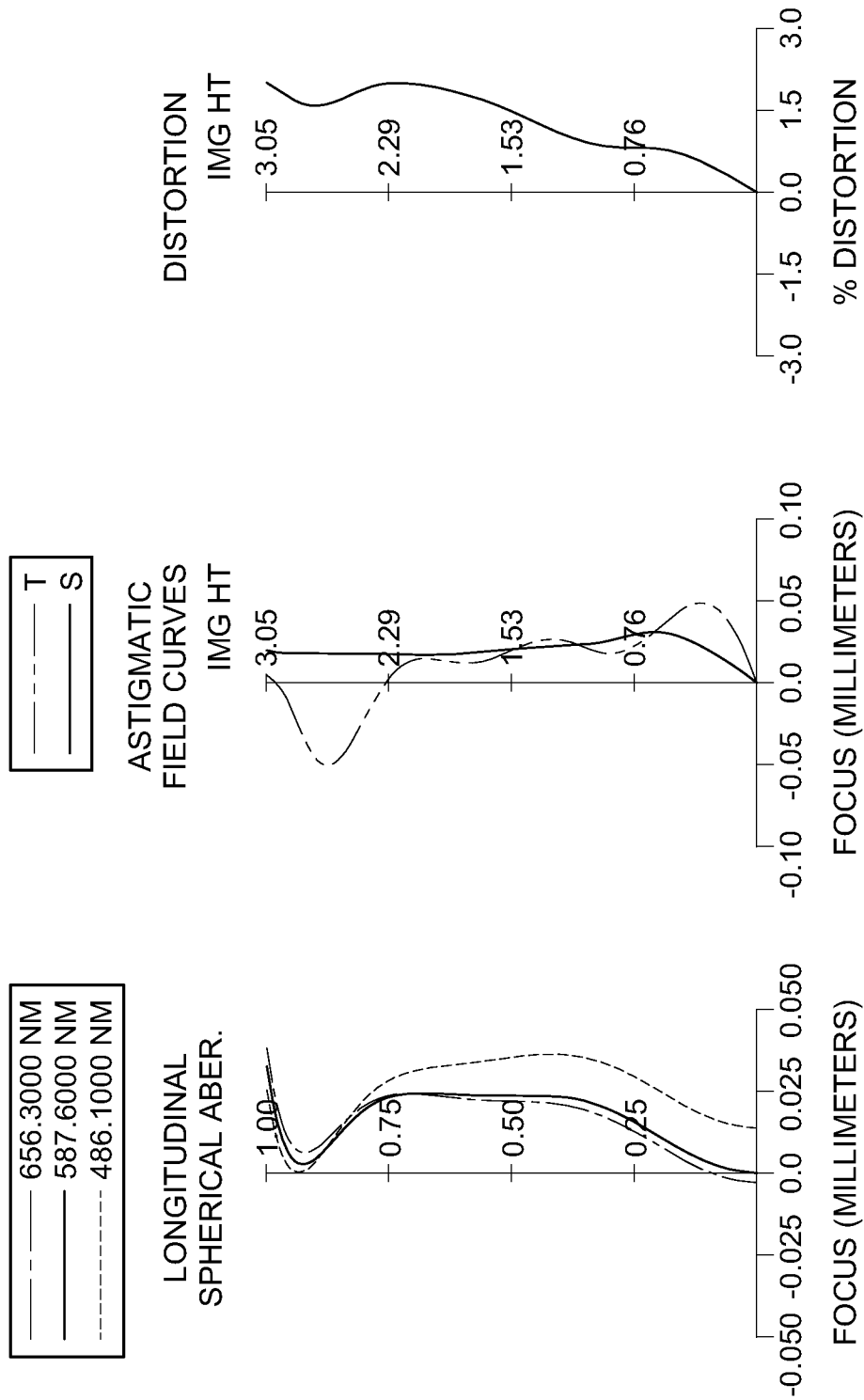
FIG. 20 shows spherical aberration curves, astigmatic field curves and a distortion curve of the imaging capturing lens assembly according to the 10th embodiment.

FIG. 19 is a schematic view of an imaging capturing lens assembly according to the 10th embodiment of the present disclosure. FIG. 20 shows spherical aberration curves, astigmatic field curves and a distortion curve of the imaging capturing lens assembly according to the 10th embodiment. In FIG. 19, the imaging capturing lens assembly includes, in order from an object side to an image side, an aperture stop 1000, the first lens element 1010, the second lens element 1020, the third lens element 1030, the fourth lens element 1040, the fifth lens element 1050, an IR-cut filter 1060 and an image plane 1070.

The first lens element 1010 with positive refractive power has a convex object-side surface 1011 and a convex image-side surface 1012, and is made of glass material. The object-side surface 1011 and the image-side surface 1012 of the first lens element 1010 are aspheric.

The second lens element 1020 with negative refractive power has a convex object-side surface 1021 and a concave image-side surface 1022, and is made of plastic material. The object-side surface 1021 and the image-side surface 1022 of the second lens element 1020 are aspheric. Furthermore, the object-side surface 1021 and the image-side surface 1022 of the second lens element 1020 both have at least one inflection point.

The third lens element 1030 with positive refractive power has a concave object-side surface 1031 and a convex image-side surface 1032, and is made of plastic material. The object-side surface 1031 and the image-side surface 1032 of the third lens element 1030 are aspheric.

The fourth lens element 1040 with negative refractive power has a concave object-side surface 1041 and a convex image-side surface 1042, and is made of plastic material. The object-side surface 1041 and the image-side surface 1042 of the fourth lens element 1040 are aspheric.

The fifth lens element 1050 with positive refractive power has a convex object-side surface 1051 and a concave image-side surface 1052, and is made of plastic material. The object-side surface 1051 and the image-side surface 1052 of the fifth lens element 1050 are aspheric. Furthermore, the object-side surface 1051 and the image-side surface 1052 of the fifth lens element 1050 both have at least one inflection point.

The IR-cut filter 1060 is made of glass and located between the fifth lens element 1050 and the image plane 1070, and will not affect the focal length of the imaging capturing lens assembly.

The detailed optical data of the 10th embodiment are shown in Table 19 and the aspheric surface data are shown in Table 20 below.

TABLE 19

10th Embodiment
f = 3.74 mm, Fno = 2.10, HFOV = 38.5 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.100 | | | | |
| 2 | Lens 1 | 2.687 | (ASP) | 0.955 | Glass | 1.566 | 61.1 | 2.53 |
| 3 | | −2.671 | (ASP) | 0.030 | | | | |
| 4 | Lens 2 | 4.329 | (ASP) | 0.230 | Plastic | 1.640 | 23.3 | −4.19 |
| 5 | | 1.621 | (ASP) | 0.517 | | | | |
| 6 | Lens 3 | −8.536 | (ASP) | 0.443 | Plastic | 1.544 | 55.9 | 6.32 |
| 7 | | −2.498 | (ASP) | 0.293 | | | | |
| 8 | Lens 4 | −0.794 | (ASP) | 0.280 | Plastic | 1.640 | 23.3 | −7.93 |
| 9 | | −1.071 | (ASP) | 0.030 | | | | |
| 10 | Lens 5 | 1.912 | (ASP) | 1.195 | Plastic | 1.544 | 55.9 | 145.63 |
| 11 | | 1.528 | (ASP) | 0.600 | | | | |
| 12 | IR-cut filter | Plano | | 0.300 | Glass | 1.517 | 64.2 | — |
| 13 | | Plano | | 0.245 | | | | |
| 14 | Image | Plano | | — | | | | |

Note:
Reference wavelength (d-line) is 587.6 nm.

TABLE 20

Aspheric Coefficients

| | Surface # | | | | |
|---|---|---|---|---|---|
| | 2 | 3 | 4 | 5 | 6 |
| k = | −7.5101E−01 | −1.4855E+01 | −6.9828E+01 | −8.3041E+00 | −1.4886E+01 |
| A4 = | −2.1798E−02 | −9.9704E−02 | −8.3356E−02 | −1.0843E−02 | −7.4455E−02 |
| A6 = | −1.7622E−02 | 8.3973E−02 | 1.3018E−01 | 1.0356E−02 | −5.2009E−02 |
| A8 = | −2.9988E−02 | −7.5259E−02 | 7.4606E−03 | 1.6130E−01 | 5.8971E−03 |
| A10 = | −2.2769E−03 | −1.0867E−02 | −1.2309E−01 | −2.5639E−01 | 1.4065E−02 |
| A12 = | 6.9496E−02 | 2.1861E−02 | 5.1983E−02 | 1.5975E−01 | 1.5835E−02 |
| A14 = | −6.4597E−02 | −6.1056E−03 | 9.7156E−04 | −4.4114E−02 | 6.0382E−02 |
| A16 = | — | — | — | — | −4.6933E−02 |

| | Surface # | | | | |
|---|---|---|---|---|---|
| | 7 | 8 | 9 | 10 | 11 |
| k = | 2.1488E+00 | −4.0288E+00 | −7.3259E−01 | −2.7550E+01 | −6.8891E+00 |
| A4 = | −2.2368E−02 | −5.8820E−02 | 1.4515E−01 | −1.2783E−01 | −4.5536E−02 |
| A6 = | −3.1207E−02 | −1.7355E−02 | −4.1681E−02 | 6.6960E−02 | 1.9060E−02 |
| A8 = | 2.2216E−02 | 1.2075E−01 | 2.1201E−02 | −4.1213E−02 | −7.9855E−03 |
| A10 = | 3.0842E−02 | −4.8515E−02 | 9.6387E−03 | 2.1025E−02 | 2.2535E−03 |
| A12 = | −3.3006E−03 | −7.3336E−03 | −3.1665E−03 | −5.8949E−03 | −3.9357E−04 |
| A14 = | −2.8976E−04 | 2.8282E−03 | −2.5993E−03 | 8.2391E−04 | 3.7212E−05 |
| A16 = | −8.8855E−04 | 8.0661E−04 | 7.7494E−04 | −4.5935E−05 | −1.4363E−06 |

In the imaging capturing lens assembly according to the 10th embodiment, the definitions of f, Fno, HFOV, V1, V2, V4, R1, R2, R3, R4, T34, T45, CT2, CT4, CT5, f4 and f5 are the same as those stated in the 1st embodiment with corresponding values for the 10th embodiment. Moreover, these parameters can be calculated from Table 19 and Table 20 as the following values and satisfy the following relationships:

| f (mm) | 3.74 | R2/R3 | −0.62 |
|---|---|---|---|
| Fno | 2.10 | R4/|R3| | 0.37 |
| HFOV (deg.) | 38.5 | T45/T34 | 0.10 |
| V2/V1 | 0.38 | (CT2 + CT4)/CT5 | 0.43 |
| (V2 + V4)/V1 | 0.76 | f/f4 | −0.47 |
| (R1 + R2)/(R1 − R2) | 0.00 | |f/f4| + |f/f5| | 0.50 |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An imaging capturing lens assembly comprising, in order from an object side to an image side:
   a first lens element with positive refractive power having a convex object-side surface and a convex image-side surface;
   a second lens element with negative refractive power having a concave image-side surface;
   a third lens element having positive refractive power;
   a fourth lens element with negative refractive power made of plastic material and having a concave object-side surface and a convex image-side surface, wherein the object-side surface and the image-side surface of the fourth lens element are aspheric; and
   a fifth lens element with refractive power made of plastic material and having a concave image-side surface, wherein an object-side surface and the image-side surface of the fifth lens element are aspheric, and the fifth lens element has at least one inflection point formed on at least one of the object-side surface and the image-side surface thereof;
   wherein a curvature radius of the object-side surface of the first lens element is R1, a curvature radius of the image-side surface of the first lens element is R2, a curvature radius of the object-side surface of the second lens element is R3, a central thickness of the second lens element is CT2, a central thickness of the fourth lens element is CT4, a central thickness of the fifth lens element is CT5, and the following relationships are satisfied:

$-0.2<(R1+R2)/(R1-R2)<1.0;$ $-1.5<R2/R3<0.8;$ and $0.20<(CT2+CT4)/CT5<0.85.$

2. The imaging capturing lens assembly of claim 1, wherein a focal length of the imaging capturing lens assembly is f, a focal length of the fourth lens element is f4, and a focal length of the fifth lens element is f5, the following relationship is satisfied:

$|f/f4|+|f/f5|<1.30.$

3. The imaging capturing lens assembly of claim 2, wherein an Abbe number of the first lens element is V1, and an Abbe number of the second lens element is V2, the following relationship is satisfied:

$0.30<V2/V1<0.55.$

4. The imaging capturing lens assembly of claim 2, wherein an axial distance between the third lens element and the fourth lens element is T34 and an axial distance between the fourth lens element and the fifth lens element is T45, the following relationship is satisfied:

$0<T45/T34<1.1.$

5. The imaging capturing lens assembly of claim 1, wherein the curvature radius of the image-side surface of the first lens element is R2, and the curvature radius of the object-side surface of the second lens element is R3, the following relationship is satisfied:

$-1.2<R2/R3<0.4.$

6. The imaging capturing lens assembly of claim 5, wherein the object-side surface of the fifth lens element is convex.

7. The imaging capturing lens assembly of claim 5, wherein the curvature radius of the object-side surface of the first lens element is R1, and the curvature radius of the image-side surface of the first lens element is R2, the following relationship is satisfied:

$-0.1<(R1+R2)/(R1-R2)<1.0.$

8. The imaging capturing lens assembly of claim 1, wherein the second lens element has at least one inflection point formed on at least one of the object-side surface and the image-side surface thereof.

9. The imaging capturing lens assembly of claim 8, wherein a focal length of the imaging capturing lens assembly is f, and a focal length of the fourth lens element is f4, the following relationship is satisfied:

$-0.9<f/f4<0.$

10. An imaging capturing lens assembly comprising, in order from an object side to an image side:
    a first lens element with positive refractive power having a convex object-side surface and a convex image-side surface;
    a second lens element with negative refractive power having a concave image-side surface;
    a third lens element having positive refractive power;
    a fourth lens element with negative refractive power made of plastic material and having a concave object-side surface and a convex image-side surface, wherein the object-side surface and the image-side surface of the fourth lens element are aspheric; and
    a fifth lens element with refractive power made of plastic material having a concave image-side surface, wherein an object-side surface and the image-side surface of the fifth lens element are aspheric, and the fifth lens element has at least one inflection point formed on at least one of the object-side surface and the image-side surface thereof;
    wherein a curvature radius of the object-side surface of the first lens element is R1, a curvature radius of the image-side surface of the first lens element is R2, an axial distance between the third lens element and the fourth lens element is T34, and an axial distance between the fourth lens element and the fifth lens element is T45, the following relationships are satisfied:

$-0.2<(R1+R2)/(R1-R2)<1.0;$ and $0<T45/T34\leq0.82.$

11. The imaging capturing lens assembly of claim 10, wherein the second lens element has at least one inflection point formed on at least one of the object-side surface and the image-side surface thereof.

12. The imaging capturing lens assembly of claim 10, wherein the curvature radius of the image-side surface of the first lens element is R2, and a curvature radius of the object-side surface of the second lens element is R3, the following relationship is satisfied:

$-1.5 < R2/R3 < 0.8.$

13. The imaging capturing lens assembly of claim 10, wherein an Abbe number of the first lens element is V1, and an Abbe number of the second lens element is V2, the following relationship is satisfied:

$0.30 < V2/V1 < 0.55.$

14. The imaging capturing lens assembly of claim 10, wherein a curvature radius of the object-side surface of the second lens element is R3, and a curvature radius of the image-side surface of the second lens element is R4, the following relationship is satisfied:

$0 < R4/|R3| < 0.80.$

15. The imaging capturing lens assembly of claim 10, wherein a focal length of the first lens element is f1, a focal length of the second lens element is f2, a focal length of the third lens element is f3, and a focal length of the fourth lens element is f4, the following relationship is satisfied:

$f1 < |f2| < f3 < |f4|.$

16. An imaging capturing lens assembly comprising, in order from an object side to an image side:
- a first lens element with positive refractive power having a convex object-side surface and a convex image-side surface;
- a second lens element with negative refractive power having a concave image-side surface;
- a third lens element having positive refractive power;
- a fourth lens element with negative refractive power made of plastic material and having a concave object-side surface and a convex image-side surface, wherein the object-side surface and the image-side surface of the fourth lens element are aspheric; and
- a fifth lens element with refractive power made of plastic material and having a concave image-side surface, wherein an object-side surface and the image-side surface of the fifth lens element are aspheric, and the fifth lens element has at least one inflection point formed on at least one of the object-side surface and the image-side surface thereof;

wherein a curvature radius of the object-side surface of the first lens element is R1, a curvature radius of the image-side surface of the first lens element is R2, an Abbe number of the first lens element is V1, an Abbe number of the second lens element is V2, a central thickness of the second lens element is CT2, a central thickness of the fourth lens element is CT4, a central thickness of the fifth lens element is CT5, and the following relationships are satisfied:

$-0.2 < (R1+R2)/(R1-R2) < 1.0;$ $0.30 < V2/V1 < 0.55;$ and $0.20 < (CT2+CT4)/CT5 < 0.85.$ 17. The imaging capturing lens assembly of claim 16, wherein the Abbe number of the first lens element is V1, the Abbe number of the second lens element is V2, and an Abbe number of the fourth lens element is V4, the following relationship is satisfied:

$0.6 < (V2+V4)/V1 < 1.0.$

18. The imaging capturing lens assembly of claim 16, wherein the curvature radius of the image-side surface of the first lens element is R2, and a curvature radius of the object-side surface of the second lens element is R3, the following relationship is satisfied:

$-1.2 < R2/R3 < 0.4.$

19. The imaging capturing lens assembly of claim 16, wherein a curvature radius of the object-side surface of the second lens element is R3, and a curvature radius of the image-side surface of the second lens element is R4, the following relationship is satisfied:

$0 < R4/|R3| < 0.80.$

20. The imaging capturing lens assembly of claim 16, wherein a focal length of the first lens element is f1, a focal length of the second lens element is f2, a focal length of the third lens element is f3, and a focal length of the fourth lens element is f4, the following relationship is satisfied:

$f1 < |f2| < f3 < |f4|.$

* * * * *